(12) United States Patent
Jamison et al.

(10) Patent No.: US 11,567,649 B2
(45) Date of Patent: *Jan. 31, 2023

(54) GROUP-BASED COMMUNICATION SYSTEM AND APPARATUS CONFIGURED TO MANAGE CHANNEL TITLES ASSOCIATED WITH GROUP-BASED COMMUNICATION CHANNELS

(71) Applicant: Slack Technologies, Inc., San Francisco, CA (US)

(72) Inventors: Britton Jamison, San Francisco, CA (US); Ryan David Morris, Almeda, CA (US); Nathalie Kowalczyk, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/987,760

(22) Filed: Aug. 7, 2020

(65) Prior Publication Data

US 2021/0026523 A1 Jan. 28, 2021

Related U.S. Application Data

(63) Continuation of application No. 16/523,622, filed on Jul. 26, 2019, now Pat. No. 10,775,990.

(51) Int. Cl.
*H04L 29/08* (2006.01)
*G06F 16/955* (2019.01)
(Continued)

(52) U.S. Cl.
CPC ...... *G06F 3/04847* (2013.01); *G06F 16/9024* (2019.01); *G06F 16/955* (2019.01);
(Continued)

(58) Field of Classification Search
CPC .............. G06F 3/04847; G06F 16/955; G06F 16/9024; G06F 40/186; H04L 12/1822;
(Continued)

(56) References Cited

U.S. PATENT DOCUMENTS 6,248,946 B1   6/2001   Dwek
7,644,144 B1   1/2010   Horvitz et al.
(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Kostas J Katsikis
(74) *Attorney, Agent, or Firm* — Lee & Hayes, P.C.

(57) ABSTRACT

Various embodiments of the present invention are directed to an improved group-based communication apparatus that is configured to efficiently manage channel title associated with group-based communication channels in a group-based communication system. The group-based communication apparatus is configured to determine and recommend channel title suggestions in association with the creation or renaming of group-based communication channels. The recommended channel title suggestions are determined based at least in part on a group-defined format protocol. The group-based communication apparatus also may be configured to utilize other data analytics (e.g., user profile data, group channel data, channel title data, channel title count data, channel title recency data, channel activity data, and/or the like) to inform the determination of recommended channel title suggestions. Additionally, the channel title data may be combined with other data of the group-based com-
(Continued)

munication workspace to assemble one or more work graph data structures as discussed in detail herein.

20 Claims, 11 Drawing Sheets

(51) Int. Cl.
  *G06F 40/186* (2020.01)
  *G06F 16/901* (2019.01)
  *H04L 12/58* (2006.01)
  *G06F 3/0484* (2022.01)
  *G06F 3/04847* (2022.01)
  *H04L 67/306* (2022.01)
  *H04L 51/043* (2022.01)
  *H04L 67/75* (2022.01)

(52) U.S. Cl.
  CPC .......... *G06F 40/186* (2020.01); *H04L 51/043* (2013.01); *H04L 67/306* (2013.01); *H04L 67/75* (2022.05)

(58) Field of Classification Search
  CPC ....... H04L 51/04; H04L 51/043; H04L 51/28; H04L 67/36; H04L 67/306
  See application file for complete search history.

(56) References Cited

U.S. PATENT DOCUMENTS

| | | | |
|---|---|---|---|
| 9,940,394 | B1 | 4/2018 | Grant et al. |
| 9,955,332 | B2 | 4/2018 | Raleigh et al. |
| 10,346,378 | B1 | 7/2019 | Jones et al. |
| 10,498,548 | B2 | 12/2019 | Katrak et al. |
| 10,506,032 | B2 | 12/2019 | Largman et al. |
| 10,541,825 | B2 | 1/2020 | Jin et al. |
| 10,547,466 | B2 | 1/2020 | Christian et al. |
| 10,572,116 | B2 | 2/2020 | Jamison et al. |
| 10,585,562 | B2 | 3/2020 | Gurtin et al. |
| 10,592,225 | B2 | 3/2020 | Gurtin et al. |
| 10,621,272 | B1 | 4/2020 | Rose et al. |
| 10,628,408 | B2 | 4/2020 | Jin et al. |
| 10,630,627 | B2 | 4/2020 | Wills et al. |
| 11,341,093 | B2 * | 5/2022 | Johnston ................. G06F 16/27 |
| 2008/0184117 | A1 * | 7/2008 | Alsbury ............. H04N 21/4113 715/719 |
| 2012/0246228 | A1 | 9/2012 | Udezue et al. |
| 2013/0007137 | A1 | 1/2013 | Azzam et al. |
| 2014/0181217 | A1 * | 6/2014 | Jolfaei ................ H04L 65/1066 709/206 |
| 2014/0298208 | A1 | 10/2014 | Tovino et al. |
| 2016/0063277 | A1 * | 3/2016 | Vu ........................ G06F 21/105 726/4 |
| 2017/0046374 | A1 | 2/2017 | Fletcher et al. |
| 2017/0147364 | A1 * | 5/2017 | Shaposhnikov .......... G06F 8/35 |
| 2017/0364830 | A1 | 12/2017 | Vigoda et al. |
| 2018/0197144 | A1 * | 7/2018 | Frank .................... G06Q 10/103 |
| 2018/0248709 | A1 * | 8/2018 | Leydon .................... H04L 51/12 |
| 2018/0287982 | A1 | 10/2018 | Draeger et al. |
| 2019/0026328 | A1 | 1/2019 | Jin et al. |
| 2019/0028287 | A1 * | 1/2019 | Jin .......................... G06F 16/27 |
| 2019/0058680 | A1 | 2/2019 | Rosania et al. |
| 2019/0104281 | A1 * | 4/2019 | Yang ...................... H04N 7/155 |
| 2020/0027447 | A1 * | 1/2020 | King ....................... G06F 3/167 |
| 2020/0106630 | A1 | 4/2020 | Bourassa et al. |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

Zendesk Featuring Susman et al., "How Slack changed the way we work by putting the customer experience first", Repeat Customer Podcast, Episode 3, Published Online on Nov. 13, 2018 and Retrieved Online Apr. 6, 2020 from <<<https://www.zendesk.com/resources/slack-customer-experience/>>>, 16 pages.

"5 Recommendations for Organizing your Slack Channels", Work Life Products & News by Atlassian, Apr. 18, 2019, 5 pages, Retrieved on Nov. 27, 2020 from: <<<https://www.atlassian.com/blog/halp/5-recommendations-for-organizing-your-slackchannels>>>.

The Extended European Search Report dated Dec. 9, 2020 for European Patent Application No. 20188008.5, 11 pages.

Japanese Office Action dated Jun. 21, 2022 for Japanese Patent Application No. 2021-101569, a foreign counterpart to U.S. Pat. No. 10,775,990, 13 pages.

Japanese Office Action dated Mar. 2, 2021 for Japanese Patent Application No. 2020-126299, a counterpart foreign application of U.S. Pat. No. 10,775,990, 2 pages.

* cited by examiner

GROUP-BASED COMMUNICATION SYSTEM AND APPARATUS CONFIGURED TO MANAGE CHANNEL TITLES ASSOCIATED WITH GROUP-BASED COMMUNICATION CHANNELS

PRIORITY

This application is a continuation of and claims the benefit of priority to U.S. patent application Ser. No. 16/523,622, filed Jul. 26, 2019 and entitled "Group-Based Communication System and Apparatus Configured to Manage Channel Titles Associated with Group-Based Communication Channels," the entire contents of which are incorporated herein by reference.

BACKGROUND

Systems have been provided for facilitating messaging communications among a plurality of users across client devices connected with a centralized messaging system. Applicant has identified a number of deficiencies and problems associated with conventional messaging systems. Through applied effort, ingenuity, and innovation, these deficiencies and problems have been solved by developing solutions that are structured in accordance with the embodiments of the present invention, many examples of which are described in detail herein.

BRIEF SUMMARY

Various embodiments of the present invention are directed to an improved group-based communication apparatus that is configured to efficiently manage channel titles associated with group-based communication channels in a group-based communication system. The group-based communication apparatus is configured to determine and recommend channel title suggestions in association with the creation or renaming of group-based communication channels. The recommended channel title suggestions are determined based at least in part on a group-defined format protocol. The group-based communication apparatus also may be configured to utilize other data analytics (e.g., user profile data, group channel data, channel title data, channel title count data, channel title recency data, channel activity data, and/or the like) to inform the determination of recommended channel title suggestions. Additionally, the channel title data may be combined with other data of the group-based communication workspace to assemble one or more work graph data structures as discussed in detail herein.

One embodiment is directed to a group-based communication apparatus configured to manage group-based communication channels of a group-based communication interface comprising at least one processor and at least one memory, the at least one memory having computer-coded instructions therein, wherein the computer-coded instructions are configured to, in execution with the at least one processor, cause the group-based communication apparatus to: receive, from a client device, a channel creation request associated with a group identifier; retrieve a group-defined channel title template associated with the group identifier from a group-based communication repository, the group-defined channel title template comprising a group-defined format protocol; cause rendering of a channel creation interface in response to receipt of the channel creation request, wherein the channel creation interface comprises a channel title interface component; detect engagement of the channel title interface component of the channel creation interface; in response to detecting the engagement of the channel title interface component, determine a first channel title suggestions set based on the group-defined format protocol of the group-defined channel title template and cause rendering of the first channel title suggestions set to the channel creation interface.

In one embodiment, each channel title suggestions of the first channel title suggestions set comprises a programmatically generated text portion and a user-defined text portion. In another embodiment, the channel title interface component is configured to facilitate user entry of the user-defined text portion. In still other embodiments, one or more of the programmatically generated text portions comprises a channel title prefix. In still other embodiments, one or more of the programmatically generated text portions comprises a channel title suffix.

In some embodiments, one or more of the channel title suggestions of the first channel title suggestions set comprises a delimiter.

In one embodiment, the channel creation request is associated with a user identifier and the group-based communication apparatus is further configured to: receive, via the channel title interface component, input of a user-defined channel title text component; associate the user-defined channel title text component with the user identifier and group identifier; and cause storage of channel title data in the group-based communication repository, wherein the channel title data comprises the user-defined channel title text component, the user identifier, and the group identifier.

In another embodiment, the group-defined format protocol is set by an administrator of a group-based communication workspace for use by users of the group-based communication workspace.

In some embodiments, the channel creation request is associated with a user identifier and the group-based communication workspace is further configured to: retrieve user profile data associated with the user identifier from the group-based communication repository; and determine the first channel title suggestions set based on the group-defined format protocol of the group-defined channel title template and based on the user profile data. In still other embodiments, the user profile data comprises at least one of user role data, user organization data, and user topic data. In one embodiment, the user profile data comprises historical channel title data associated with the user identifier.

In another embodiment, the group-based communication apparatus is further configured to: retrieve group channel data associated with the group identifier from the group-based communication repository; and determine the first channel title suggestions set based on the group-defined format protocol of the group-defined channel title template and based on the group channel data. In still other embodiments, the group channel data comprises channel title count data, wherein the channel title count data corresponds to the number of times a user-defined channel title text component is used in a group-based communication workspace. In one embodiment, the group channel data comprises title recency data for one or more group-based communication channels, wherein the channel title recency data corresponds to a length of time since a user-defined channel title text component was stored in association with each of the one or more group-based communication channels in a group-based communication workspace. In another embodiment, the group channel data comprises channel activity data for one or more group-based communication channels, wherein the channel activity data corresponds to a level of user activity associated with each of the one or more group-based communication channels in a group-based communication workspace.

In some embodiments, the group-based communication apparatus is further configured to: retrieve system channel data, wherein the system channel data is correlated to all public group-based communication channels of a group-based communication system; and determine the first channel title suggestions set based on the group-defined format protocol of the group-defined channel title template and based on the system channel data.

In another embodiment, the group-based communication apparatus is further configured to: generate a work graph data structure, wherein the work graph data structure is based at least in part on metadata, body content data, and channel title data; and determine the first channel title suggestions set based on the group-defined format protocol of the group-defined channel title template and based on the work graph data structure. In still other embodiments, the work graph data structure comprises at least one of user-topic work graph data, user-user work graph data, channel-topic work graph data and user-channel work graph data.

In other embodiments, the group-based communication apparatus is further configured to: access channel title data stored in the group-based communication repository; determine channel title rankings for user-defined channel title text components based on the channel title data; compare the channel title ranking of each user-defined channel title text component with a predetermined threshold to determine one or more channel title suggestions; and determine the first channel title suggestions set based on the group-defined format protocol of the group-defined channel title template and based upon the channel title rankings of the one or more channel title suggestions. In another embodiment, the channel title ranking of each of the one or more channel title suggestions satisfies the predetermined threshold. In still other embodiments, the group-based communication apparatus is further configured to: cause ordering of the channel title suggestions of the first channel title suggestions set within the channel creation interface based on the channel title rankings. In another embodiment, the group-based communication apparatus is further configured to: cause ordering of the channel title suggestions of the first channel title suggestions set within the channel creation interface based on the alphabetical sequence of the channel title suggestions.

In one embodiment, the group-based communication apparatus is further configured to: retrieve channel title description components for one or more group-based communication channels associated with each channel title suggestion of the first channel title suggestions set from the group-based communication repository; and cause rendering of the channel title description components in association with the rendering of the first channel title suggestions set to the channel creation interface.

In some embodiments, the engagement is a keystroke engagement of the channel title interface component. In still other embodiments, the engagement is a non-keystroke engagement of the channel title interface component.

In another embodiment, the group-based communication apparatus is further configured to: detect a keystroke engagement of the channel title interface component of the channel creation interface; determine a second channel title suggestions set based on the group-defined format protocol of the group-defined channel title template and the detected keystroke engagement; and automatically update the channel creation interface to replace the first channel title suggestions set with the second channel title suggestions set.

In some embodiments, the channel creation interface further comprises a channel invitation interface component and the group-based communication apparatus is further configured to receive channel invitation input entered in the channel invitation interface component, wherein the channel invitation input comprises an indication of at least one user recipient to be sent an invitation to join the group-based communication channel; and determine the first channel title suggestions set based on the group-defined format protocol of the group-defined channel title template and based upon the channel invitation input.

In some embodiments, the group identifier associated with the channel creation request is a first group identifier, the first group identifier is associated with a first group-based communication workspace, and the group-based communication apparatus is further configured to: detect a keystroke engagement of the channel title interface component of the channel creation interface; determine the detected keystroke engagement is associated with a second group identifier associated with a second group-based communication workspace; determine a first workspace suggestions set based on the detected keystroke engagement, wherein the first workspace suggestions set comprises the second group-based communication workspace; and automatically update the channel creation interface to replace the first channel title suggestions set with the first workspace suggestions set.

In some embodiments, the user-defined channel title text component does not comply with the group-defined format protocol and the group-based communication apparatus is further configured to provide notification of such non-compliance.

Still other embodiments are directed to a computer implemented method for managing group-based communication channels of a group-based communication interface, the computer implemented method comprising: receiving, from a client device, a channel creation request associated with a group identifier; retrieving a group-defined channel title template associated with the group identifier from a group-based communication repository, the group-defined channel title template comprising a group-defined format protocol; causing rendering of a channel creation interface in response to receipt of the channel creation request, wherein the channel creation interface comprises a channel title interface component; detecting engagement of the channel title interface component of the channel creation interface; and in response to detecting the engagement of the channel title interface component, determining a first channel title suggestions set based on the group-defined format protocol of the group-defined channel title template and causing rendering of the first channel title suggestions set to the channel creation interface.

In other embodiments, each channel title suggestion of the first channel title suggestions set comprises a programmatically generated text portion and a user-defined text portion. In another embodiment, the channel title interface component is configured to facilitate user entry of the user-defined text portion. In still other embodiments, one or more of the programmatically generated text portions comprises a channel title prefix. In still other embodiments, one or more of the programmatically generated text portions comprises a channel title suffix. In another embodiment, one or more of the channel title suggestions of the first channel title suggestions set comprises a delimiter.

In one embodiment, the channel creation request is associated with a user identifier and the computer implemented method further comprises: receiving, via the channel title interface component, input of a user-defined channel title text component; associating the user-defined channel title text component with the user identifier and group identifier; and causing storage of channel title data in the group-based communication repository, wherein the channel title data comprises the user-defined channel title text component, the user identifier, and the group identifier.

In another embodiment, the group-defined format protocol is set by an administrator of a group-based communication workspace for use by users of the group-based communication workspace.

In some embodiments, the channel creation request is associated with a user identifier and the computer implemented method further comprises: retrieving user profile data associated with the user identifier from the group-based communication repository; and determining the first channel title suggestions set based on the group-defined format protocol of the group-defined channel title template and based on the user profile data. In still other embodiments, the user profile data comprises at least one of user role data, user organization data, and user topic data. In one embodiment, the user profile data comprises historical channel title data associated with the user identifier.

In another embodiment, the computer implemented method further comprises: retrieving group channel data associated with the group identifier form the group-based communication repository; and determining the first channel title suggestions set based on the group-defined format protocol of the group-defined channel title template and based on the group channel data. In still other embodiments, the group channel data comprises channel title count data, wherein the channel title count data corresponds to the number of times a user-defined channel title text component is used in a group-based communication workspace. In one embodiment, the group channel data comprises title recency data for one or more group-based communication channels, wherein the channel title recency data corresponds to a length of time since a user-defined channel title text component was stored in association with each of the one or more group-based communication channels in a group-based communication workspace. In another embodiment, the group channel data comprises channel activity data for one or more group-based communication channels, wherein the channel activity data corresponds to a level of user activity associated with each of the one or more group-based communication channels in a group-based communication workspace.

In some embodiments, the computer implemented method further comprises: retrieving system channel data, wherein the system channel data is correlated to all public group-based communication channels of a group-based communication system; and determining the first channel title suggestions set based on the group-defined format protocol of the group-defined channel title template and based on the system channel data.

In another embodiment, the computer implemented method further comprises: generating a work graph data structure, wherein the work graph data structure is based at least in part on metadata, body content data, and channel title data; and determining the first channel title suggestions set based on the group-defined format protocol of the group-defined channel title template and based on the work graph data structure. In still other embodiments, the work graph data structure comprises at least one of user-topic work graph data, user-user work graph data, channel-topic work graph data, and user-channel work graph data.

In other embodiments, the computer implemented method further comprises: accessing channel title data stored in the group-based communication repository; determining channel title rankings for user-defined channel title text components based on the channel title data; comparing the channel title ranking of each user-defined channel title text component with a predetermined threshold to determine one or more channel title suggestions; and determining the first channel title suggestions set based on the group-defined format protocol of the group-defined channel title template and based upon the channel title rankings of the one or more channel title suggestions. In another embodiment, the channel title ranking of each of the one or more channel title suggestions satisfies the predetermined threshold. In still other embodiments, the computer implemented method further comprises: causing ordering of the channel title suggestions of the first channel title suggestions set within the channel creation interface based on the channel title rankings. In another embodiment, the computer implemented method further comprises: causing ordering of the channel title suggestions of the first channel title suggestions set within the channel creation interface based on the alphabetical sequence of the channel title suggestions.

In one embodiment, the computer implemented method further comprises: retrieving channel title description components for one or more group-based communication channels associated with each channel title suggestion of the first channel title suggestions set from the group-based communication repository; and causing rendering of the channel title description components in association with the rendering of the first channel title suggestions set to the channel creation interface.

In some embodiments, the engagement is a keystroke engagement of the channel title interface component. In still other embodiments, the engagement is a non-keystroke engagement of the channel title interface component.

In another embodiment, the computer implemented method further comprises: detecting a keystroke engagement of the channel title interface component of the channel creation interface; determining a second channel title suggestions set based on the group-defined format protocol of the group-defined channel title template and the detected keystroke engagement; and automatically updating the channel creation interface to replace the first channel title suggestions set with the second channel title suggestions set.

In some embodiments, the channel creation interface further comprises a channel invitation interface component and the computer implemented method further comprises: receiving channel invitation input entered in the channel invitation interface component, wherein the channel invitation input comprises an indication of at least one user recipient to be sent an invitation to join the group-based communication channel; and determining the first channel title suggestions set based on the group-defined format protocol of the group-defined channel title template and based upon the channel invitation input.

In some embodiments, the group identifier associated with the channel creation request is a first group identifier, the first group identifier is associated with a first group-based communication workspace, and the computer implemented method further comprises: detecting a keystroke engagement of the channel title interface component of the channel creation interface; determining the detected keystroke engagement is associated with a second group identifier associated with a second group-based communication workspace; determining a first workspace suggestions set based on the detected keystroke engagement, wherein the first workspace suggestions set comprises the second group-based communication workspace; and automatically updating the channel creation interface to replace the first channel title suggestions set with the first workspace suggestions set.

In some embodiments, the user-defined channel title text component does not comply with the group-defined format protocol and the computer implemented method further comprises providing notification of such non-compliance.

One embodiment is directed to a computer program product, the computer program product comprising at least one non-transitory computer-readable storage medium having computer-executed program code instructions stored therein, the computer-executable program code instructions comprising: program code instructions configured to receive, from a client device, a channel creation request associated with a group identifier; program code instructions configured to retrieve a group-defined channel title template associated with the group identifier from a group-based communication repository, the group-defined channel title template comprising a group-defined format protocol; program code instructions configured to cause rendering of a channel creation interface in response to receipt of the channel creation request, wherein the channel creation interface comprises a channel title interface component; program code instructions configured to detect engagement of the channel title interface component of the channel creation interface; and program code instructions configured to determine a first channel title suggestions set based on the group-defined format protocol of the group-defined channel title template and cause rendering of the first channel title suggestions set to the channel creation interface.

Another embodiment is directed to a group-based communication apparatus, the group-based communication apparatus configured to manage group-based communication channels, the group-based communication apparatus comprising at least one processor and at least one memory, the at least one memory having computer-coded instructions therein, wherein the computer-coded instructions are configured to, in execution with the at least one processor, cause the group-based communication apparatus to: receive, from a client device, a channel settings modification request associated with a group identifier and a channel identifier; retrieve channel title data for the group-based communication channel associated with the channel identifier from a group-based communication repository, wherein the channel title data comprises a user-defined channel title text component associated with the channel identifier; retrieve a group-defined channel title template associated with the group identifier from the group-based communication repository, the group-defined channel title template comprising a group-defined format protocol; cause rendering of a channel settings interface in response to receipt of the channel settings modification request, wherein the channel settings interface comprises a channel title update interface component; detect engagement of the channel title update interface component of the channel settings interface; and in response to detecting the non-keystroke engagement of the channel title update interface component, determine a first channel title update suggestions set based on the group-defined format protocol of the group-defined channel title template and cause rendering of the first channel title update suggestions set to the channel settings interface. In some embodiments, the channel settings modification request is associated with a user identifier and the group-based communication apparatus is further configured to: receive, via the channel title update interface component, input of a user-defined updated channel title text component; associate the user-defined updated channel title text component with the user identifier, group identifier, and channel identifier; and cause storage of channel title data in the group-based communication repository, wherein the channel title data comprises the user-defined updated channel title text component, the user identifier, group identifier, and the channel identifier and wherein the user-defined updated channel title text component replaces the user-defined channel title text component.

Still other embodiments are directed to a computer implemented method for managing group-based communication channels of a group-based communication interface, the computer implemented method comprising: receiving, from a client device, a channel settings modification request associated with a group identifier and a channel identifier; retrieving channel title data for the group-based communication channel associated with the channel identifier from a group-based communication repository, wherein the channel title data comprises a user-defined channel title text component associated with the channel identifier; retrieving a group-defined channel title template associated with the group identifier from the group-based communication repository, the group-defined channel title template comprising a group-defined format protocol; causing rendering of a channel settings interface in response to receipt of the channel settings modification request, wherein the channel settings interface comprises a channel title update interface component; detecting engagement of the channel title update interface component of the channel settings interface; and in response to detecting the engagement of the channel title update interface component, determining a first channel title update suggestions set based on the group-defined format protocol of the group-defined channel title template and causing rendering of the first channel title update suggestions set to the channel settings interface.

Another embodiment is directed to a computer program product, the computer program product comprising at least one non-transitory computer-readable storage medium having computer-executed program code instructions stored therein, the computer-executable program code instructions comprising: program code instructions configured to receive, from a client device, a channel settings modification request associated with a group identifier and a channel identifier; program code instructions configured to retrieve channel title data for the group-based communication channel associated with the channel identifier from a group-based communication repository, wherein the channel title data comprises a user-defined channel title text component associated with the channel identifier; program code instructions configured to retrieve a group-defined channel title template associated with the group identifier from a group-based communication repository, the group-defined channel title template comprising a group-defined format protocol; program code instructions configured to cause rendering of a channel settings interface in response to receipt of the channel settings modification request, wherein the channel settings interface comprises a channel title update interface component; program code instructions configured to detect engagement of the channel title update interface component of the channel settings interface; and program code instructions configured to determine a first channel title update suggestions set based on the group-defined format protocol of the group-defined channel title template and cause rendering of the first channel title update suggestions set to the channel creation interface.

BRIEF DESCRIPTION OF THE SEVERAL VIEWS OF THE DRAWINGS

Having thus described some embodiments in general terms, reference will now be made to the accompanying drawings, which are not necessarily drawn to scale.

Figure 1:
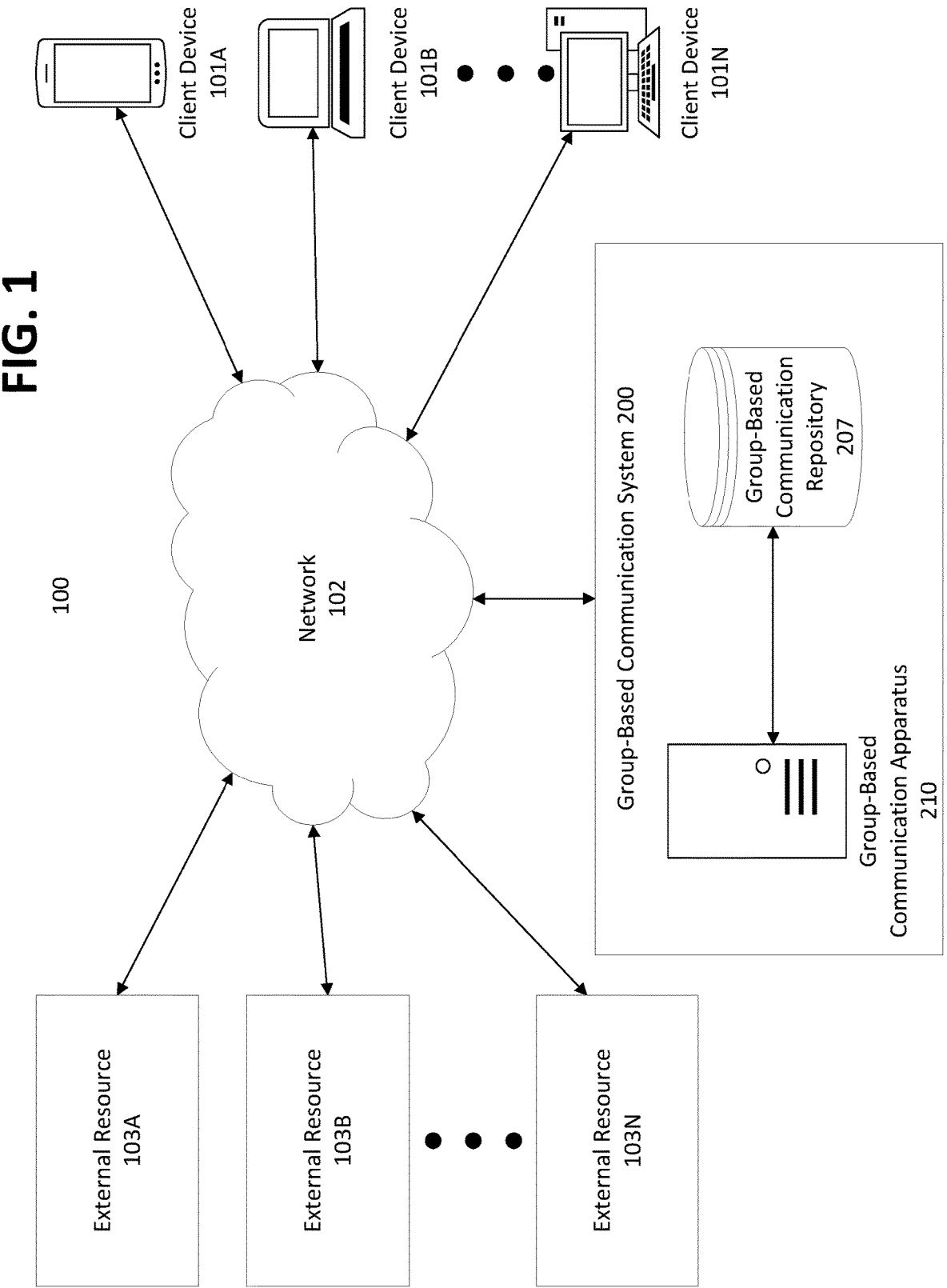

FIG. 1 shows a schematic view of a group-based communication system in communication with client devices and external resources according to various embodiments of the present invention.

Figure 2:
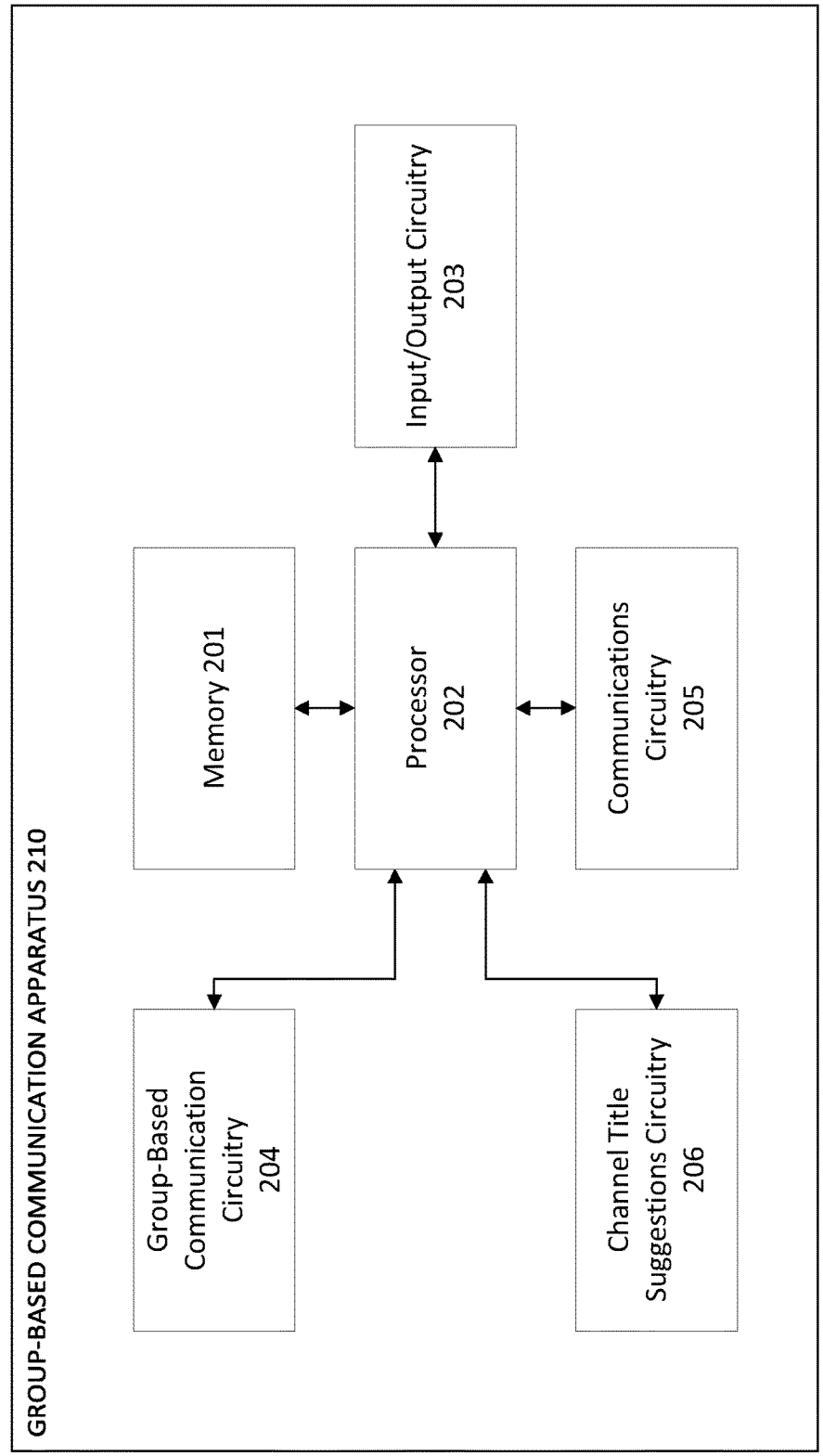

FIG. 2 shows a schematic view of a group-based communication apparatus according to one embodiment.

Figure 3A:
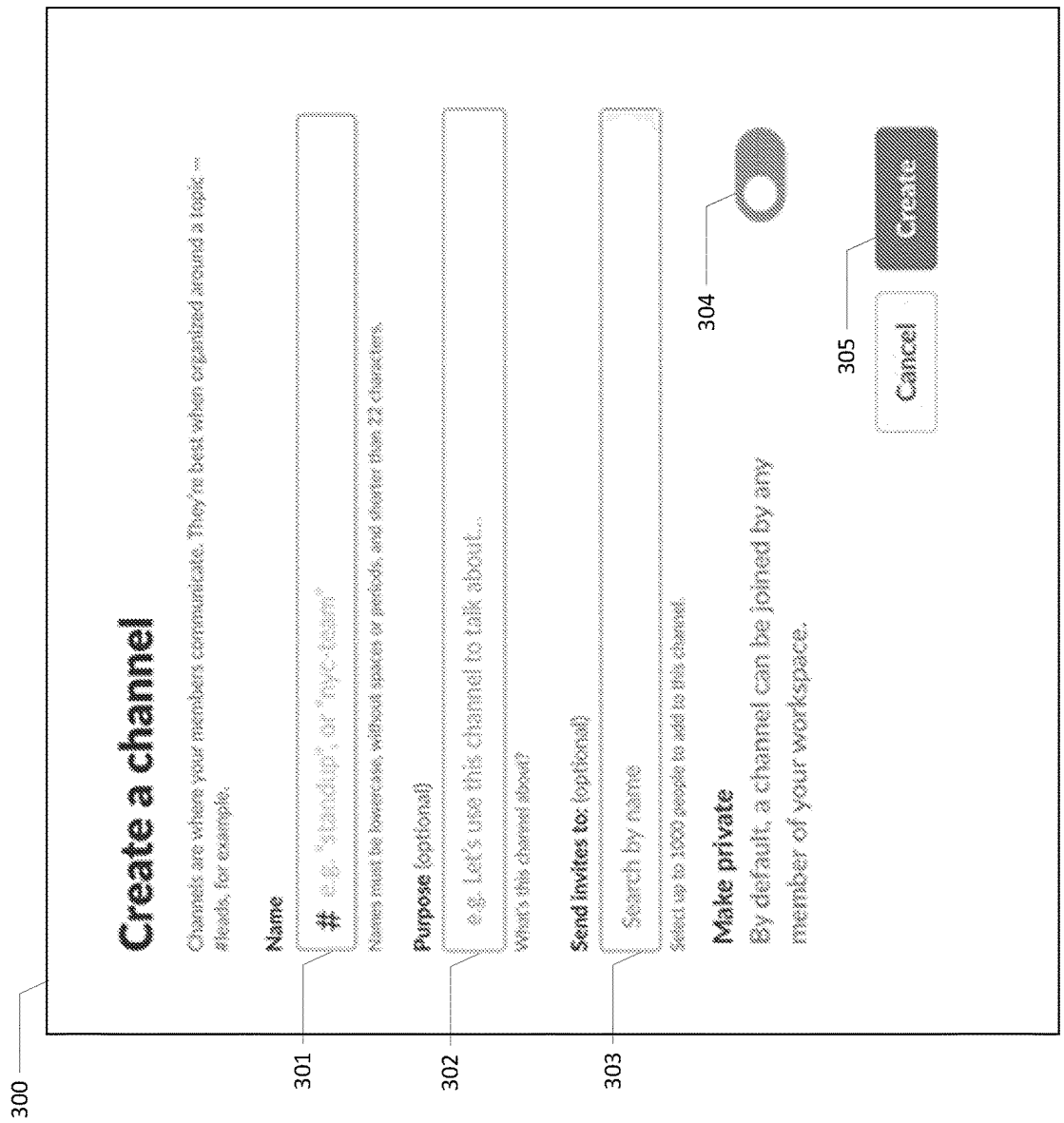

FIG. 3A shows an example channel creation interface configured in accordance with one embodiment.

Figure 3B:
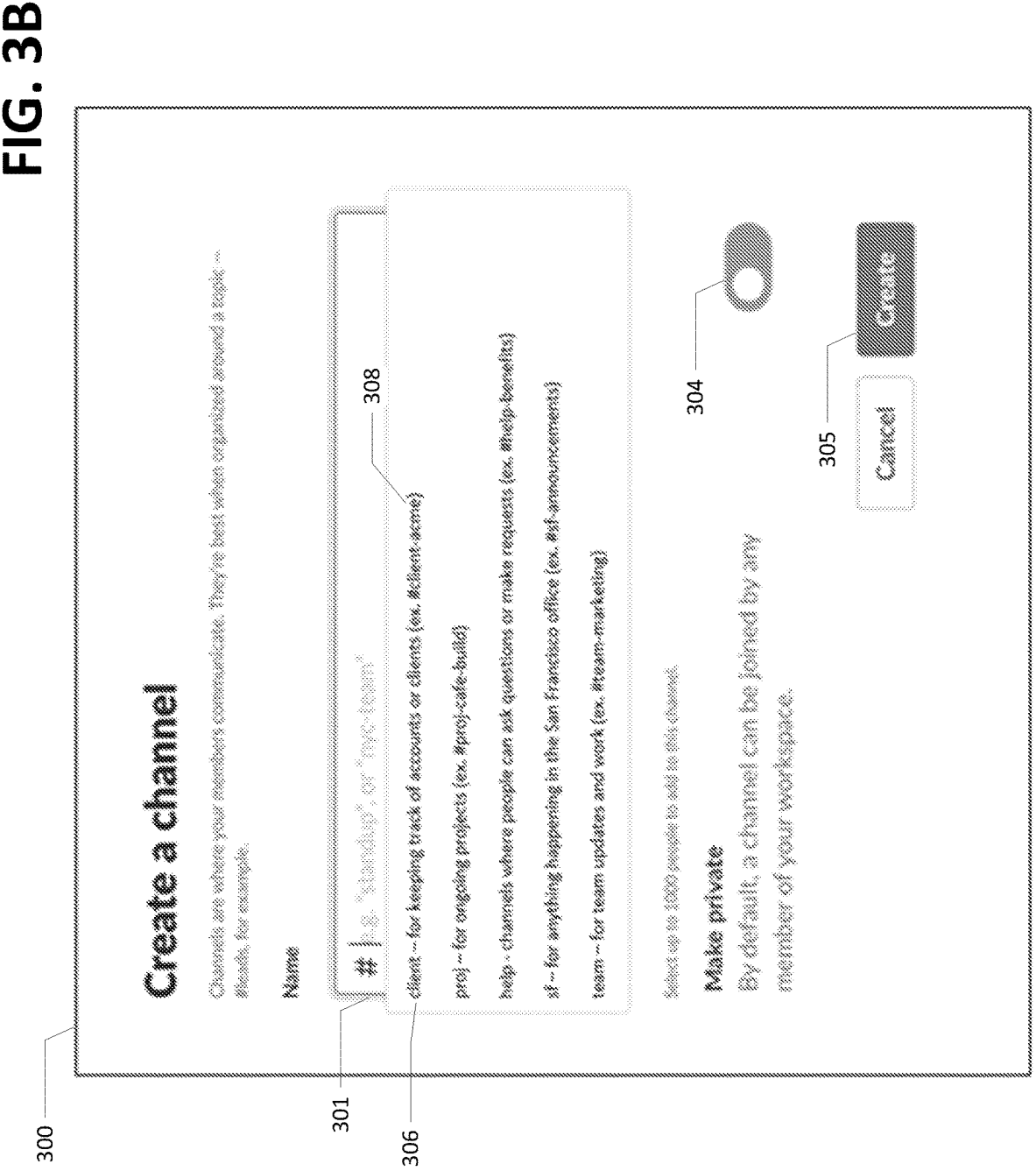

FIG. 3B shows an example channel creation interface comprising a rendering of channel title suggestions in accordance with one embodiment.

Figure 3C:
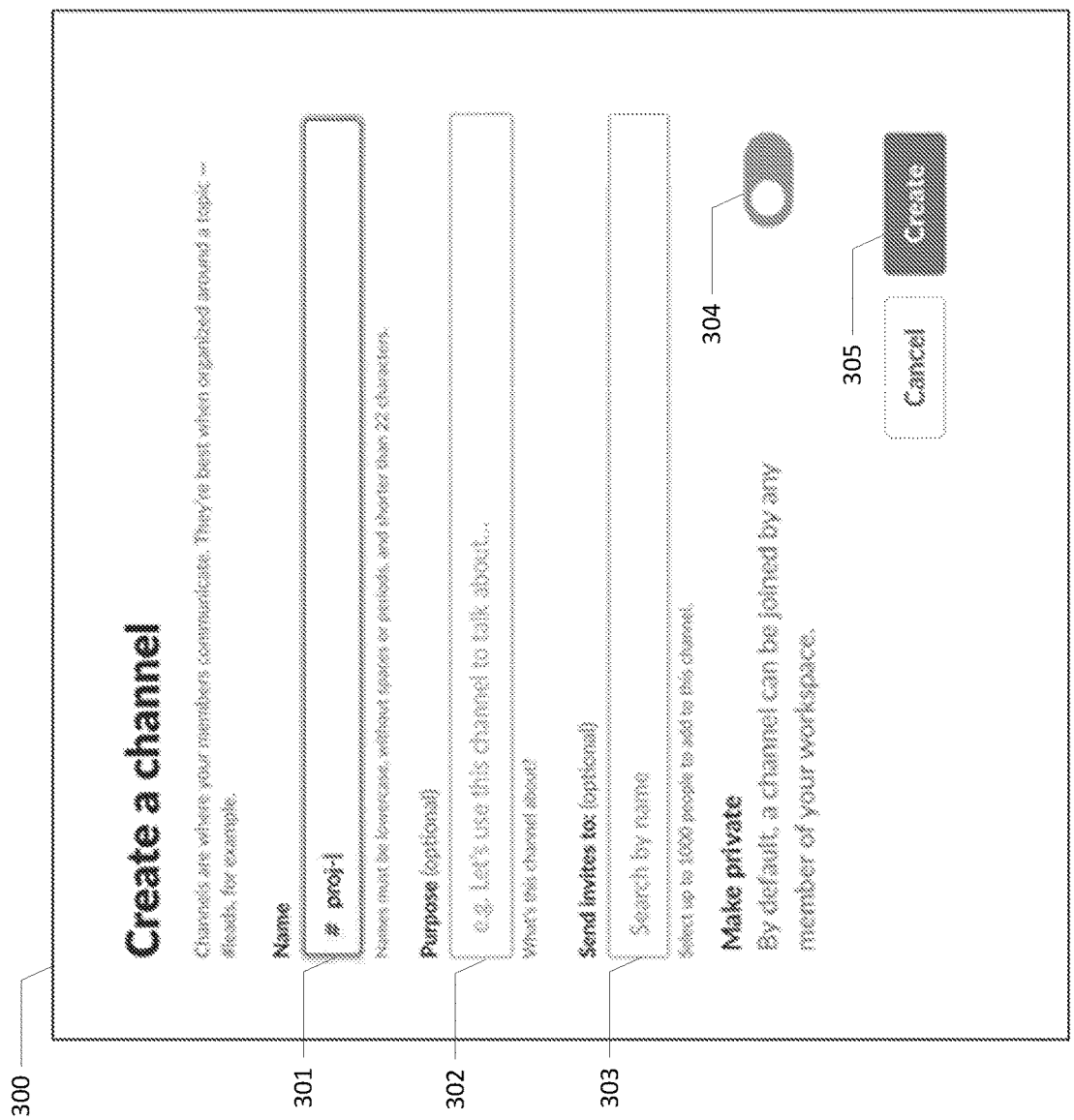

FIG. 3C shows an example channel creation interface in accordance with one embodiment.

Figure 3D:
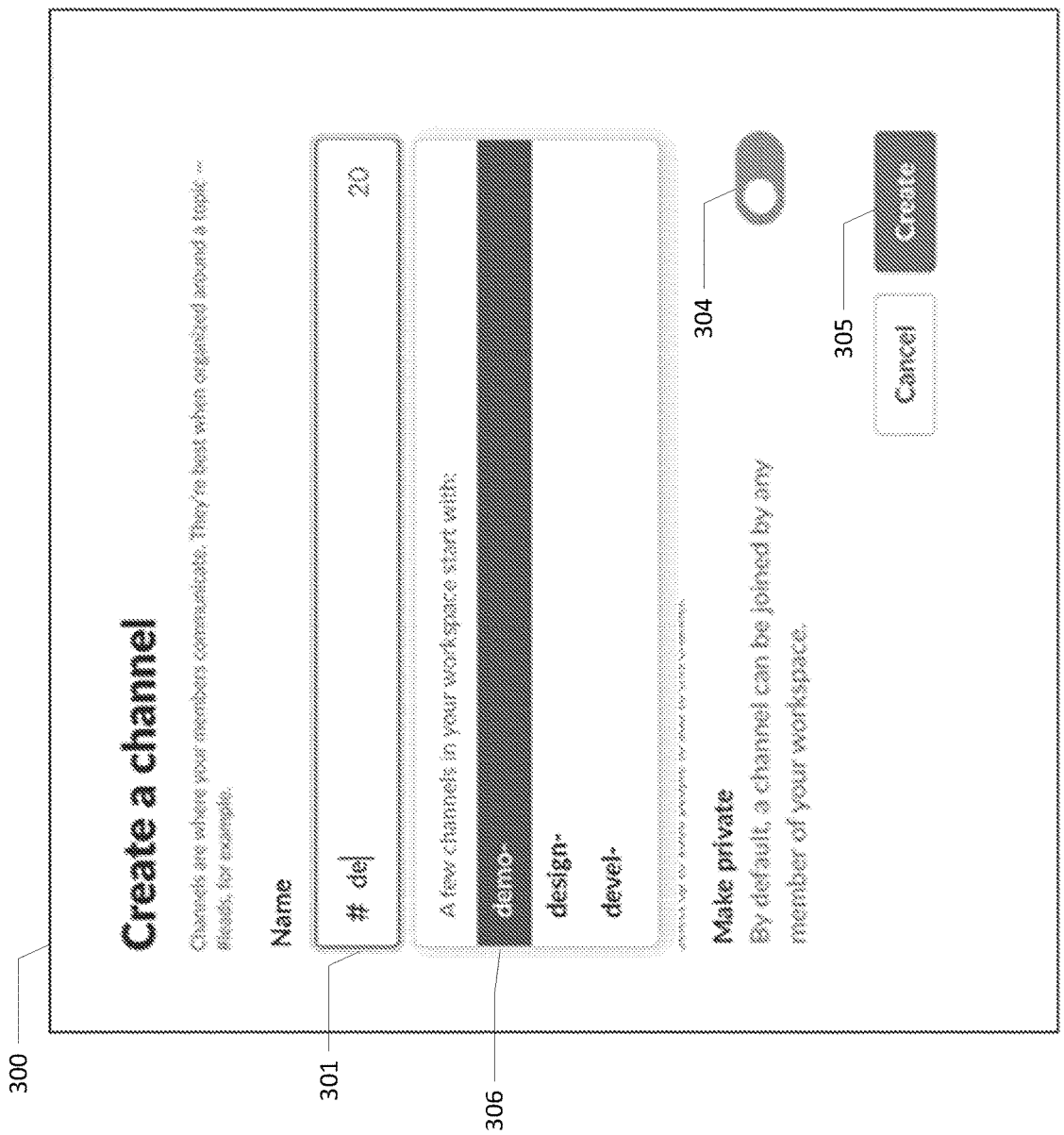

FIG. 3D shows an example channel creation interface comprising a rendering of channel title suggestions in accordance with one embodiment.

Figure 4A:
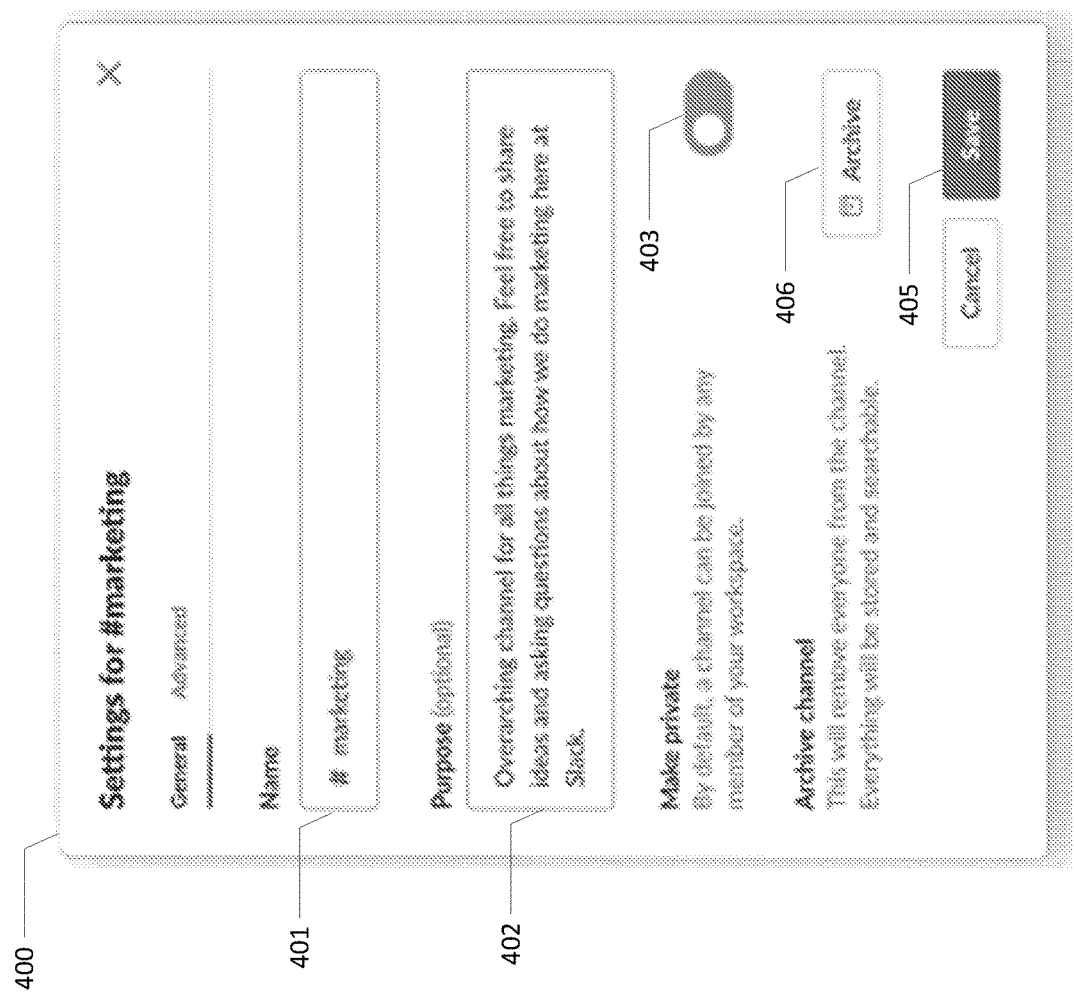

FIG. 4A shows an example channel settings interface configured in accordance with one embodiment.

Figure 4B:
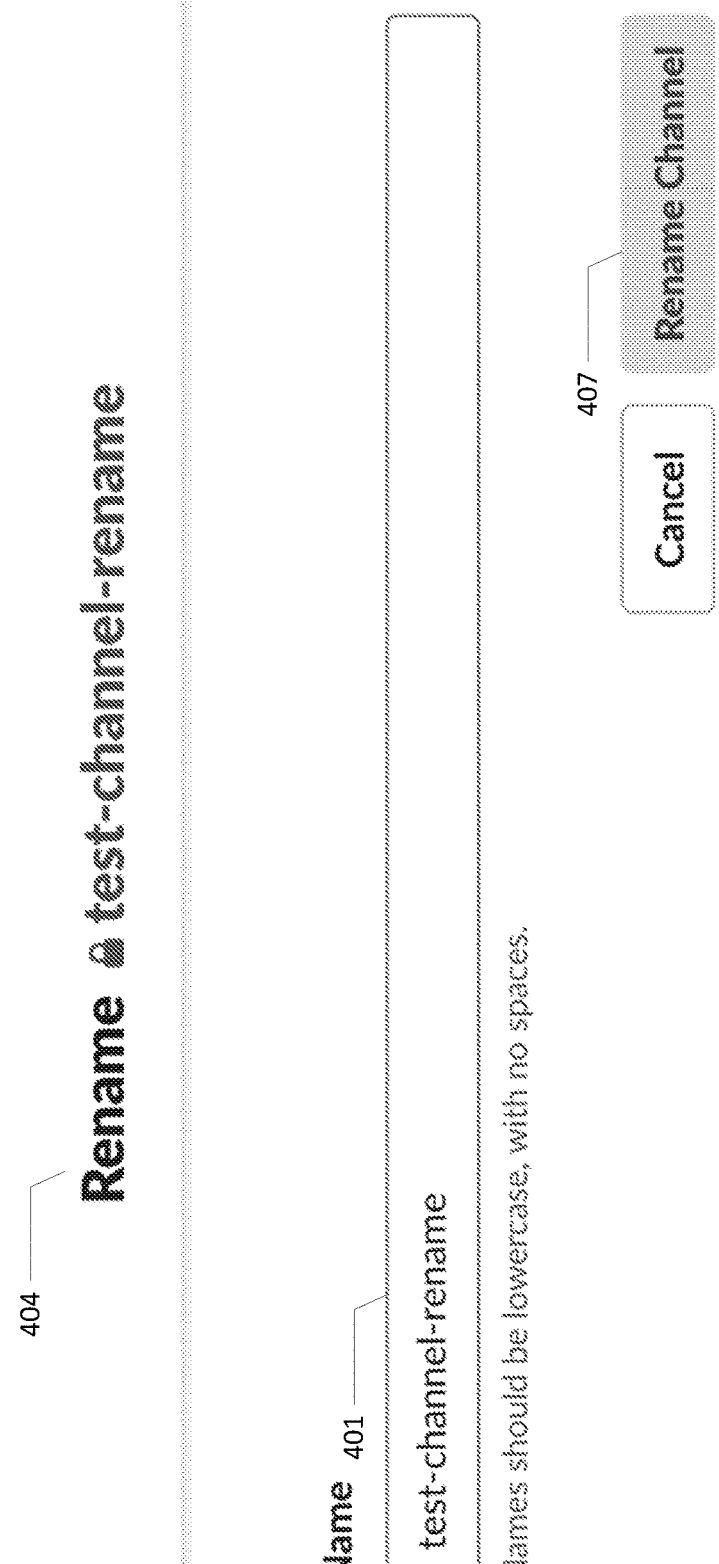

FIG. 4B shows an example channel renaming interface in accordance with one embodiment.

Figure 4C:
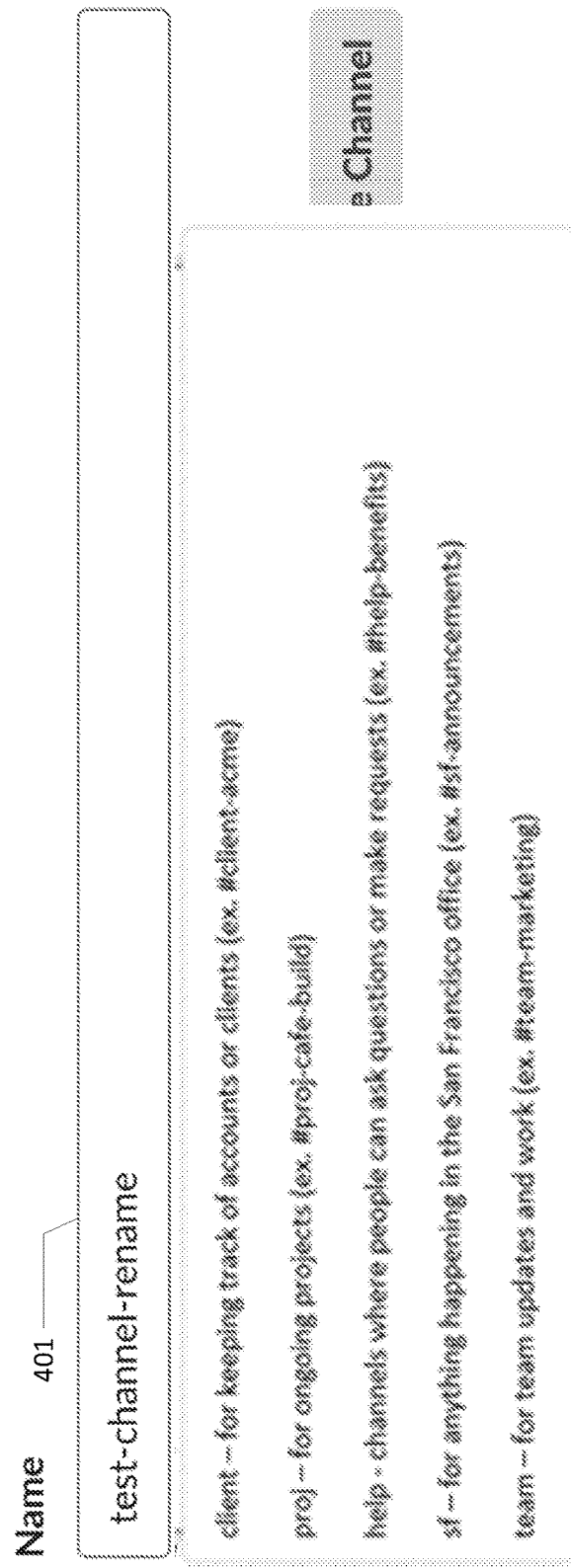

FIG. 4C shows an example channel renaming interface comprising a rendering of channel title suggestions in accordance with one embodiment.

Figure 5A:

FIG. 5A is a flowchart illustrating example steps for determining first channel title suggestions set and storing channel title data comprising a user-defined channel title text component in group-based communication system in accordance with one embodiment.

Figure 5B:
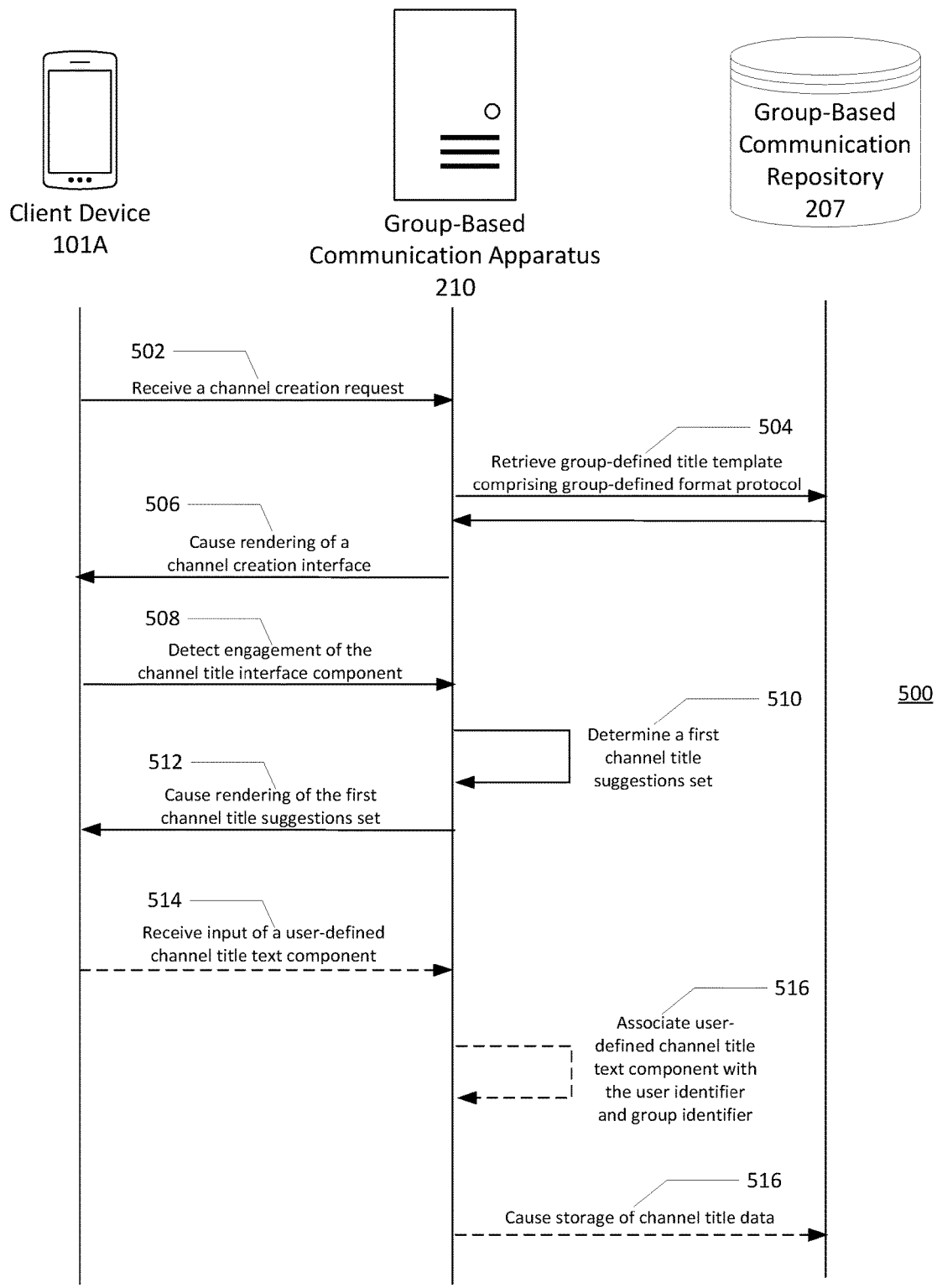

FIG. 5B is a signal diagram of an example data flow in accordance with one embodiment.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

A group-based communication system may have multiple group-based communication workspaces, each group-based communication workspace dedicated to a particular organizational group or team having a defined member list (i.e., a defined list of authenticated user accounts). Each group-based communication workspace includes a plurality of group-based communication channels. Users communicate with one another via the group-based communication channels.

Channel titles are established at creation of each respective group-based communication channel Because channel titles serve as a consistent identifier for the associated group-based communication channel, it is important that users construct channel titles from which group members can readily understand the purpose of the group-based communication channel based simply on the channel title. Determining a channel title without guidance, however, may be difficult for a new user creating a channel Indeed, regardless of whether a user is new to a group-based communication system or not, a user creating a new channel may incur unnecessary frustration when the user encounters a free form field intended for entry of a channel title. Without guidance, the resulting channel titles often are not suggestive of the intended content/messages posted to the channel and are not terribly meaningful to other users in the group-based communication system. As a result, users incur difficulty when trying to locate channels relevant to them. This problem is exacerbated as the number of users and channels increase for any particular group-based communication workspace. In addition, when channel titles are not uniform, indexing and retrieval of channel data or search results from such channels suffers delays. Thus, it is desirable for the group-based communication system to support multiple users and multiple group-based communication channels while allowing users to easily create and identify relevant group-based communication channels and increasing efficiency of indexing and search capabilities.

Applicant has identified that establishing channel naming conventions is important to improving any implementation of a group-based communication system. Channel naming conventions or norms reduce the complexity and time it takes to create new and useful channel titles. Moreover, channel naming conventions or norms make it easier for users to understand the content of a channel simply by viewing its title. The easier to understand a channel title is, the more likely that the group-based communication channel will be useful for its intended members. With channel naming conventions or norms, a user can locate relevant channels more easily and make more productive use of the group-based communication system, which leads to more users adopting and utilizing the group-based communication system. Channel naming conventions or norms can ease the channel creation process and also educate users how to use channels. In addition, when titles for group-based communication channels have more uniformity, the indexing and searching capabilities of the group-based communication system are more efficient.

Various embodiments of the present invention are directed to an improved group-based communication apparatus that is configured to efficiently manage group-based communication channels of a group-based communication interface. The group-based communication apparatus is configured to recommend channel title suggestions in association with the creation or renaming of group-based communication channels.

In one example, a group-defined channel title template comprising a group-defined format protocol is stored by a group-based communication apparatus. The group-based communication apparatus is configured to identify a first channel title suggestions set using the group-defined format protocol in response to a channel creation request by a user. Such first channel title suggestions set may then be rendered to the channel creation interface of the group-based communication interface, easing the process for channel creators to create new and useful channels faster with channel titles that allow other users to identify and navigate to relevant content associated with the group-based communication channel.

In another example, the group-based communication apparatus is configured to receive input of a user-defined channel title text component authored by a user. Such custom user-defined channel title text component may be stored as channel title data by the group-based communication apparatus in association with a group identifier for the user. Such channel title data provides a robust and dynamic supply from which the group-based communication apparatus can retrieve title information, informing its determination of future channel title suggestions and making channel title suggestions more meaningful and instructive to group-based communication system users. This is particularly true when a group-based communication object corpus is drawn from a group-based communication channels and used, in conjunction with associated channel title data, to assemble a work graph data structure. This work graph data structure may be illustrative of relationships between various users, group-based communication channels, channel title data, and other group-based communication objects. Such a work graph data structure may be leveraged via machine-learning and/or artificial-intelligence configurations and/or models to present users with expansive, relevant channel title suggestions (e.g., with an integrated ranking hierarchy to indicate levels of relevance to the user).

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like. The users referred to herein are enabled to access a group-based communication system using client devices. Each user of the group-based communication system is associated with at least one "group identifier". Each group identifier is a unique number. For example, in one embodiment, a group identifier may be stored as a 64 bit unsigned integer and represented externally (outside of memory) as a base-34 encoded string.

The term "group-based" is used herein to refer to a system, channel, communication, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, users, group-based communication channels, etc., with specific groups of a group-based communication system as defined below.

The term "group-based communication system" refers to a communications software platform and associated hardware that is configured to support and maintain a plurality of group-based communication workspaces and all associated functionality. Group-based communication system users are organized into organization groups (e.g., employees of different companies may be separate organization groups) and each group interacts with the system via a respective group-based communication workspace. For example, the group-based communication system might support, among others, a Slack Corporation group-based communication workspace and an ACME Corporation group-based communication workspace. Example group-based communication systems comprise supporting servers, client devices, and third-party resources.

The terms "user profile," "user account," and "user account details" refer to information of a group-based communication system that is associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user profile details can include a subset designation of user credentials, such as, for example, login information for the user including the user's username and password.

As used herein, the term "user identifier" refers to one or more items of data by which a user and this user's corresponding user account may be identified within a group-based communication system. For example, a user identifier may comprise ASCII text, a pointer, a memory address, or other unique identifier.

The terms "group identifier" or "team identifier" refer to one or more items of data by which a group within a group-based communication system may be identified. For example, a group identifier may comprise ASCII text, a pointer, a memory address, and the like. Group identifiers are used to distinguish group-based communication channels, messages, files, members, etc., associated with one group-based communication workspace from another group-based communication workspace.

The term "group-based communication server" refers to a software platform and associated hardware that is configured to manage access to the various group-based communication workspaces (defined below) of the group-based communication system. The group-based communication server is configured to access, maintain, and support application product logic of the group-based communication system and to access one or more data repositories such as a group-based communication repository.

The term "group-based communication workspace" refers to a virtual communications environment configured to facilitate user interaction with a group-based communication system. Each group-based communication workspace is accessible and viewable (as a group-based communication interface defined below) to a select group of users, such as a group of employees of a business or organization (e.g., the Slack Corp. interface would be accessible and viewable to the Slack employees however the ACME Corporation group-based communication workspace would not be accessible and viewable to Slack employees). The group-based communication workspace includes a plurality of group-based communication channels (e.g., a marketing channel, sales channel, accounting channel, etc.), which are defined herein. In various embodiments, user profiles sharing a common group identifier (defined below) form part of a common group-based communication workspace.

The term "group-based communication interface" is a graphical user interface of a group-based communication system that is configured to allow users to (e.g., group members) to view and engage a group-based communication workspace. A group-based communication interface is rendered to a client device based on data and instructions provided by the group-based communication system. In some embodiments, such data and instructions are facilitated by a dedicated software application running on the client device. In other embodiments, such data and instructions are provided through a web browser running on the client device.

The term "group-based communication channel" refers to a virtual communications environment or feed that is configured to display messaging communications posted by channel members (e.g., validated users accessing the environment using client devices) that are viewable only to the members of the channel. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "messaging communication" and "message" refer to any electronically generated digital content object provided by a user using a client device and that is configured for display within a group-based communication channel Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a timestamp that identifies the time of the message, a group identifier, and a group-based communication channel identifier. Each of the foregoing identifiers may comprise ASCII text, a pointer, a memory address, and the like. In addition to metadata, messaging communications or digital content objects also include body content data that comprises text, an image, a file, video, or the like.

The term "group-based communication object" refers to electronic data objects or digital content objects specifically executable and/or otherwise accessible via the group-based communication system and/or at least one external resource. Group-based communication objects may be received at the group-based communication system by receiving those group-based communication objects conveyed to (pushed to) the group-based communication system, or the group-based communication system may retrieve (pull to) various group-based communication objects stored within accessible storage areas of one or more client devices, external resources, and/or the like. The group-based communication objects include body content data and metadata. The body content data of the group-based communication objects may be interpreted by the group-based communication apparatus to display or otherwise convey human-readable representations of information and/or computer-executable content that causes a particular client device to operate in a particular way. Specifics of certain group-based communication objects examples are discussed herein, however, it should be understood that in certain embodiments, group-based communication objects may be embodied as messaging communications, emails, events, audio files, video files, document files, spreadsheet files, presentation files, tasks, and/or the like; as well as any contextual data corresponding therewith. Group-based communication objects may thus be non-personal (alternatively referred to as public) as they are exchanged between a plurality of users or otherwise made available to a plurality of users. Alternatively, group-based communication objects may be personal in nature (e.g., as defined by a portion of metadata associated with the group-based communication object), such that access to the content of the group-based communication object is limited to a single user (or a limited number of defined users). For example, group-based communication objects personal to a single user may encompass tasks or task lists defined personally by and for a particular user. Access to personal group-based communication objects may be limited to access requests associated with defined user identifiers. In certain embodiments, personal group-based communication objects may be represented as encrypted data when indexed in database storage areas and/or when included within work graph data structures including personal and non-personal group-based communication objects.

A "sending user identifier" is associated with a collection of messages that are sent by a particular user (e.g., sent by a client device associated with the particular user, user identifier, or user profile). These messages may be analyzed or parsed to determine context regarding the user (e.g., the user's expertise or interest in a topic may be determined based on the frequency of mention of the topic or key words associated with the topic within such messages). A sending user identifier may comprise ASCII text, a pointer, a memory address, and the like.

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access settings such that it is not generally accessible and/or searchable by other members of the group-based communication system (i.e., members associated with other group-based communication workspaces). For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "permitted group-based communication channel(s)" refers to one or more group-based communication channels or private group-based communication channels that have been approved or authenticated for access by a user (e.g., a user profile) associated with a selected user identifier.

The term "channel creation request" refers to an electrically generated digital object that indicates that a user has provided an input comprising a request to create a group-based communication channel A channel creation request may be represented via a temporary code that notifies a recipient that a user has made the request. To provide further context, a channel creation request is generated in response to a user interaction with a group-based communication interface presented on a display screen of a client device. A user causes the client device to generate a channel creation request by interacting with, for example, a specific channel-creation actuator button that forms part of the group-based communication interface.

The term "channel settings modification request" refers to an electrically generated digital object that indicates that a user has provided an input comprising a request to modify the settings associated with a group-based communication channel A channel settings modification request may be represented via a temporary code that notifies a recipient that a user has made the request. To provide further context, a channel settings modification request is generated in response to a user interaction with a group-based communication interface presented on a display screen of a client device. A user causes the client device to generate a channel settings modification request by interacting with, for example, a "Settings" visual indicator or actuator button that forms part of the group-based communication interface.

The term "non-keystroke engagement" refers to user interaction, via a graphical user interface, with a channel title interface component in which such user interaction is free from (i.e., excludes) the entering of one or more (e.g., keystroke) characters into a channel title interface component. For example, touch-screen or mouse click engagement with a channel title interface component is one example of non-keystroke engagement.

The term "keystroke engagement" refers to entering of one or more keystrokes into a channel title interface component of a graphical user interface. For example, input of one or more characters (e.g., alphanumeric characters) into a channel title interface component is one example of keystroke engagement.

The term "channel title description component" refers to a user interface element that is rendered as a portion of a channel creation interface and is configured to display an explanation of how the user may use a corresponding channel title suggestion. In some embodiments, the channel title description component includes both an explanation of the channel title suggestion and an instructive example of the channel title suggestion in context. For example, the channel title description components 308 displayed below the channel title interface component 301 in FIG. 3B are examples of channel title description components. In FIG. 3B, the channel title description component 308 associated with the channel title suggestion "proj-" provides an explanation (i.e., "for ongoing projects") and an instructive example (i.e., "#proj-cafe-build").

As used herein, the term "channel creation interface" refers to a user interface element that is rendered to a group-based communication interface and is configured to enable a user to view and enter parameters for creation of a group-based communication channel. For example, the channel creation interface 300 of FIGS. 3A-3D are examples of channel creation interfaces.

As used herein, the term "channel settings modification interface" refers to a user interface element that is rendered to a group-based communication interface and is configured to enable a user to view and modify parameters of a pre-existing group-based communication channel. For example, the channel settings modification interface 400 of FIG. 4A is an example of a channel settings modification interface.

The term "channel title interface component" refers to a user interface element that is rendered as a portion of a channel creation interface and is configured to enable a user to interact with the group-based communication system and enter a channel title or text string for a group-based communication channel. For example, the channel title interface components 301 of FIG. 3A-3D are examples of channel title interface components.

The term "channel title update interface component" refers to a user interface element that is rendered as a portion of a channel settings modification interface or channel renaming interface and is configured to enable a user to interact with the group-based communication system and enter an updated channel title or text string to rename a pre-existing group-based communication channel. For example, the channel title update interface components 401 of FIG. 4A-4C are examples of channel title update interface components.

The term "channel invitation interface component" refers to a user interface element that is rendered as part of a channel creation interface and is configured to enable a user to input channel invitation data indicative of at least one or more non-member users so that such one or more non-member users may be sent an invitation to join a group-based communication channel. For example, the channel invitation interface component 303 of FIG. 3A is an example of a channel invitation interface component.

The term "group-defined channel title template" refers to a group-wide nomenclature, formatting structure, field array, and/or layout of a channel title for a group-based communication channel when such channel is created so that group members may readily understand the purpose of any associated group-based communication channel.

The term "group-defined format protocol" should be understood to refer to formatting parameters, procedures, limitations, configurations, and/or policies regulating channel title designation in a particular group-based communication workspace in a group-based communication system. Such group-defined format protocols define parameters throughout a particular group-based communication workspace.

For example, a group-defined format protocol may define the language, length, or type of characters (e.g., alphanumeric characters) permitted in a channel title of a group-based communication channel. In one embodiment, the group-defined format protocol may be set by an administrator of a group-based communication workspace for use by users of the group-based communication workspace. Additional variations of a group-defined format protocol are also contemplated by this disclosure and definition.

The term "user-defined channel title text component" refers to a channel name, channel title, text string, or portion(s) thereof created by a client device upon user engagement with a channel title interface component of a channel creation interface. A user-defined channel title text component may be parsed to determine common or relevant portions thereof for channel title suggestions. For example, a user-defined channel title text component may be analyzed to determine the use of a common channel title prefix that may be programmatically generated as part of a channel title suggestion. The user-defined channel title text component is stored in real-time to a group-based communication repository at the time a group-based communication channel is created for common identification to all members of the group-based communication workspace.

The term "user-defined updated channel title text component" refers to a channel name, channel title, text string, or portion(s) thereof created by a client device upon user engagement with a channel title update interface component. Like the user-defined channel title text component (discussed above), a user-defined updated channel title text component may be parsed to determine common or relevant portions thereof for channel title suggestions. The user-defined updated channel title text component is stored in real-time to a group-based communication repository at the time a pre-existing group-based communication channel is renamed for common identification to all members of the group-based communication workspace.

The term "channel title data" refers to one or more items of data related to one or more group-based communication channels, including but not limited to, a user-defined channel title text component and channel metadata. Each group-based communication channel of the group-based communication system includes channel metadata comprising the following: a channel-creator user identifier, a group identifier, a group-based communication channel identifier, an indication of whether the channel is private or public, and the like. Each of the foregoing identifiers may comprise ASCII text, a pointer, a memory address, and the like.

The term "historical channel title data" refers to all channel title data where a particular user identifier is indicated as the channel-creator user identifier.

A "channel-creator user identifier" is associated with a collection of group-based communication channels that are created by a particular user identifier (e.g., created by a client device associated with the particular user, user identifier, or user profile). A channel-creator user identifier may comprise ASCII text, a pointer, a memory address, and the like.

The term "group channel data" refers to one or more items of data related to one or more group-based communication channels within a group-based communication workspace, including but not limited to, channel title data (described above), channel title count data, channel title recency data, channel activity data, and channel metadata. Each group-based communication channel of the group-based communication system includes channel metadata comprising the following: a channel-creator user identifier, a group identifier, a group-based communication channel identifier, access settings data (i.e., data indicating whether the channel is private or public), and the like.

The term "channel title count data" refers to data values that capture information that quantifies the number of times a user-defined channel title text component or a portion thereof is used in a specific group-based communication workspace. Each data value comprising the group channel title count data is associated with a user-defined channel title text component or a portion thereof in order quantify the number of times said user-defined channel title text component or portion thereof has been utilized in a specific group-based communication workspace.

The term "channel title recency data" refers to data values that capture information regarding a length of time since a user-defined channel title text component or a portion thereof was stored in association with a group-based communication channel.

The term "channel activity data" refers to data values that capture information regarding a level of user activity associated with a group-based communication channel. The channel activity data is based on user activity within a group-based communication channel. In some embodiments, the channel activity data may represent a rate with which users access a particular group-based communication channel (i.e. the number of times that users have accessed a particular group-based communication channel over a particular time period (e.g. over the last 28 days)). However, in other embodiments, the channel activity data may simply track, such as via a counter, the number of times that users have accessed a group-based communication channel without regards to a particular time period. In some embodiments, the channel activity data may represent a rate with which users post messages to a particular group-based communication channel (i.e. the number of times that users post messages to a particular group-based communication channel over a particular time period (e.g. over the last 28 days)). However, in other embodiments, the channel activity data may simply track the number of times that users have posted messages in a particular group-based communication channel Other variations of the channel activity data are also contemplated by this disclosure and definition as will be apparent to one of ordinary skill in the art.

The term "system channel data" refers to one or more items of data related to one or more group-based communication channels within a group-based communication system, regardless of any associated group-based communication workspace. System channel data may include, but is not limited to, channel title data, channel title count data, channel title recency data, channel activity data, and channel metadata (e.g. a channel-creator user identifier, a group identifier, a group-based communication channel identifier, access settings data (i.e., data indicating whether the channel is private or public), and the like).

The term "external resource" refers to a software program, application, platform, or service that is configured to communicate with the group-based communication system for providing an external service (i.e., not native to the group-based communication system) to a client device via a group-based communication interface and/or via a group-based communication workspaces.

The term "external resource user identifier" refers to one or more items of data by which a user (or user profile) of an external resource may be uniquely identified by a group-based communication system. For example, an external resource user identifier may comprise ASCII text, a pointer, a memory address, and the like. One or more external resource user identifiers may be stored to a user profile of a group-based communication system along with other identifiers (e.g., user identifier, group identifiers, group-based communication channel identifiers, etc.). The external resource user identifier may be embodied in a format native to the external resource or may be structured in a format designated by the group-based communication system. Correlating one or more external resource user identifiers to a user account or user identifier of the group-based communication system allows the group-based communication system to link accounts from disparate external resources with a selected group-based communication system user account. The external resource user identifier may include an integer identifier, a universally unique identifier, an email address, a random string, and/or the like. In such a case, the group-based communication server may receive the external resource user identifier during the open authorization (OAuth) process.

The term "group-based communication data" refers to information accessed and stored by the group-based communication server to facilitate the operations of the group-based communication system. For example, the group-based communication data may include, without limitation, group-defined channel title template(s), user-defined channel title text component(s), user profile data, group channel data, channel data, channel title data, channel title recency data, channel activity data, user identifiers, channel-creator user identifiers, group identifiers, channel metadata, channel title description component(s), and/or the like.

The term "group-based communication repository" refers to the location, such as a memory device, where one or more user activity data logs or other group-based communication data are stored. The group-based communication repository may be a dedicated device and/or a part of a larger repository. The group-based communication repository may be dynamically updated or be static. For example, the user activity data logs may be uploaded to the group-based communication repository simultaneously with the creation of the user activity data logs. Alternatively, the user activity data logs may not be uploaded simultaneously with their creation and instead may be batch uploaded based on other factors, such as based on time intervals (e.g., uploads occur every 15 minutes), user initiation (e.g., user may press a button to initiate the upload), or the like. The group-based communication repository may be encrypted in order to limit unauthorized access of user activity data logs and associated engagement data.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 200 via a communications network 102 using client devices 101A-101N. The group-based communication system 200 may comprise a group-based communication apparatus 210 in communication with at least one group-based communication repository 207. Users may further access features or services of one or more external resources 103A-103N through the group-based communication system 200.

Communications network 102 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 102 may include a cellular telephone, an 802.11, 802.16, 802.20, and/or WiMax network. Further, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication apparatus 210 may be embodied as a computer or computers. The group-based communication apparatus 210 may provide for receiving of electronic data from various sources, including but not necessarily limited to the client devices 101A-101N. For example, the group-based communication apparatus 210 may be operable to receive and post or transmit group-based messaging communications provided by the client devices 101A-101N.

The group-based communication repository 207 may be embodied as a data storage device(s) such as a Network Attached Storage (NAS) device or devices, or as a separate database server or servers. The group-based communication repository 207 includes information accessed and stored by the group-based communication apparatus 210 to facilitate the operations of the group-based communication system 200. For example, the group-based communication repository 207 may include, without limitation, a plurality of messaging communications organized among a plurality of group-based communication channels, a plurality of user-defined channel title text components, a plurality of user identifiers, and/or the like.

The client devices 101A-101N may be any computing device as defined above. Electronic data received by the group-based communication apparatus 210 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smartphone or tablet, the client device 101A-101N may execute an "app" to interact with the group-based communication system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the client device 101A-101N may interact with the group-based communication system 200 via a web browser. As yet another example, the client devices 101A-101N may include various hardware or firmware designed to interface with the group-based communication system 200.

Each of external resources 103A-103N represents an external system, resource, service, software application, computer, or the like, that a user of a client device associated with a corresponding group-based communication system user account may access via the group-based communication system 200. For example, the group-based communication system 200 may access an external resource via one or more application programming interfaces (APIs). An external resource may provide a specific service via a group-based communication interface of the group-based communication system 200. In one example, an external resource 103A may be a validated software source code repository, or the like, which members of a group-based communication workspace may collectively access as they collaborate to develop a new software application.

An external resource 103A-103N may be embodied in a variety of ways utilizing a variety of computing devices. For example, an external resource 103A-103N may be a computer or server remote from the group-based communication system 200 and accessible over the network 102 (e.g., over the Internet for example).

In some embodiments, the group-based communication system 200 is configured to access an external resource utilizing an external resource user identifier stored by the group-based communication system 200, such as in group-based communication repository 207. The external resource user identifier may include, or otherwise be associated with and retrievable together with, an external resource access token associated with the external resource and/or group-based communication system user account. A group-based communication system 200 may store one or more external resource user identifiers including or associated with an external resource access token(s) to enable API requests to the external resource.

In some embodiments of an exemplary group-based communication system 200, a message or messaging communication may be sent from a client device 101A-101N to a group-based communication system 200. In various implementations, the message may be sent to the group-based communication system 200 over communications network 102 directly by a client device 101A-101N, the message may be sent to the group-based communication system 200 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like.

In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL      <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
```

```xml
            <client_IP>10.0.0.123</client_IP>
            <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>app with webkit</client_app_type>
            <app_installed_flag>true</app_installed_flag>
            <app_name>nickname.app</app_name>
            <app_version>1.0 </app_version>
            <app_webkit_name>Mobile Safari</client_webkit_name>
            <client_version>537.51.2</client_version>
        </client_details>
        <client_details> //iOS Client with Webbrowser
            <client_IP>10.0.0.123</client_IP>
            <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
        </client_details>
        <client_details> //Android Client with Webbrowser
            <client_IP>10.0.0.123</client_IP>
            <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
        </client_details>
        <client_details> //Mac Desktop with Webbrowser
            <client_IP>10.0.0.123</client_IP>
            <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
            <client_product_type>MacPro5,1</client_product_type>
            <client_serial_number>YXXXXXXXXZ</client serial number>
            <client UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <message>
            <message_identifier>ID_message_10</message_identifier>
            <team_identifier>ID_team_1</team_identifier>
            <channel_identifier>ID_channel_1</channel_identifier>
            <body contents>That is an interesting invention. I have attached a copy our patent policy.</body contents>
            <attachments>patent_policy.pdf</attachments>
        </message>
    </auth_request>
```

The group-based communication system 200 comprises at least one group-based communication apparatus 210 that may create a storage message based upon the received message to facilitate message indexing and storage in a group-based communication repository 207. In one implementation, the storage message may include data such as a message identifier, a group identifier, a group-based communication channel identifier, a sending user identifier, topics, responses, message contents (i.e., body contents), attachments, message hierarchy data, third party metadata, conversation primitive data, and/or the like. For example, the group-based communication apparatus 205 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1/channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <body contents>That is an interesting disclosure. I have attached a copy our patent
policy.</body contents>
    <attachments>patent_policy.pdf</attachments>
    <conversation_primitive>
        conversation includes messages: ID_message_8, ID_message_9, ID_message_10,
        ID_message_11, ID_message_12
    </conversation_primitive>
</storage_message>
```

In embodiments, a sending user identifier may be associated with the message communication. In one implementation, the message may be parsed (e.g., using PHP—i.e., the script language derived from Personal Home Page Tools—commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, a group-based communication workspace, a group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the group-based communication channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 207). In one implementation, a storage message may be sent from group-based communication apparatus 210 to facilitate indexing in group-based communication repository 207. In another implementation, metadata associated with the message may be determined and the message may be indexed in group-based communication repository 207. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 207 to facilitate searching. In one embodiment, the files may be indexed such that a company's or a group's files are indexed at a separate distributed repository.

Example Apparatus for Implementing Embodiments of the Present Disclosure

The group-based communication apparatus 210 may be embodied by one or more computing systems, such as group-based communication apparatus 210 shown in FIG. 2. The group-based communication apparatus 210 may include a processor 202, a memory 201, input/output circuitry 203, communications circuitry 205, group-based communication circuitry 204, and channel title suggestions circuitry 206. The apparatus 210 may be configured, using one or more of the circuitry 203, 204, 205, and 206, to execute the operations described herein.

Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 210 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the group-based communication apparatus 210 to carry out various functions in accordance with example embodiments of the present disclosure.

The processor 202 may be embodied in a number of different ways and may, for example, include one or more processing devices configured to perform independently. Additionally, or alternatively, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-101N (shown in FIG. 1) to enable message sharing therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 101A-101N. The processor 202 may also provide to distribute such stored and/or indexed messages across various group-based communication workspaces and associated group-based communication channels as discussed herein.

In some embodiments, the group-based communication apparatus 200 may include input/output circuitry 203 that may, in turn, be in communication with processor 202 to provide output to the user and, in some embodiments, to receive an indication of a user input. The input/output circuitry 203 may comprise a user interface (e.g., a group-based communication interface) and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the group-based communication apparatus 210. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The group-based communication circuitry 204 includes hardware and software configured to support a group-based communication system 200. The group-based communication circuitry 204 may utilize processing circuitry, such as the processor 202, to perform these actions. The group-based communication circuitry 204 may send and/or receive data from group-based communication repository 207. In some implementations, the sent and/or received data may be group-based communication objects (e.g., messages, files, links, etc.) organized among a plurality of group-based communication channels. It should also be appreciated that, in some embodiments, the group-based communication circuitry 204 may include a separate processor, specially configured field programmable gate array (FPGA), or application specific interface circuit (ASIC).

The channel title suggestions circuitry 206 includes hardware and software configured to support channel title suggestions related functionality, features, and/or services of the group-based communication system 200. The channel title suggestions circuitry 206 may utilize processing circuitry, such as the processor 202, to perform these actions. The channel title suggestions circuitry 206 may send and/or receive data from group-based communication repository 207. In some implementations, the sent and/or received data may be user-defined channel title text components, channel title description components, channel title suggestions, channel-creator user identifiers, group channel data, channel title data, and associated data that is configured for association with one or more group-based communication channels. It should also be appreciated that, in some embodiments, the channel title suggestions circuitry 206 may include a separate processor, specially configured field programmable gate array (FPGA), or application specific interface circuit (ASIC).

It is also noted that all or some of the information discussed herein can be based on data that is received, generated and/or maintained by one or more components of the group-based communication apparatus 210. In some embodiments, one or more external systems (such as a remote cloud computing and/or data storage system, one or more external resources 103A-103N) may also be leveraged to provide at least some of the functionality discussed herein.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs miming on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

FIG. 3A depicts an example channel creation interface 300 structured in accordance with various embodiments of the invention. The depicted channel creation interface 300 comprises a channel title interface component 301, a channel purpose interface component 302, a channel invitation interface component 303, a channel access settings element 304, and a channel create execution element 305. The channel creation interface 300 is rendered in response to receipt of a channel creation request associated with a group identifier. In some embodiments, the channel creation interface 300 is revealed and/or accessed once a user clicks on a plus icon visual indicator (e.g., "⊕") (not shown) in relation to a "Channels" interface element (not shown) of a sidebar pane of a group-based communications interface (not shown). In other embodiments, the user clicks a "Create" interface element (not shown).

The channel title interface component 301 is configured for, among other things, user entry of a user-defined channel title text component as explained in more detail below. The channel purpose interface component 302 is configured for optional user entry of a description or purpose to signify to other users of the channel's intended use when such users browse channels. In embodiments, emojis can be optionally entered by a user into the channel purpose interface components. In embodiments, emojis within a channel purpose interface component may be utilized to associate a tone, emotion, or sentiment with a channel title. The channel invitation interface component 303 is configured for optional user entry of other user recipients to be sent an invitation to join the group-based communication channel to be created as discussed in more detail below.

The depicted channel access settings element 304 is configured to allow a user to specify the accessibility and searchability of the group-based communication channel to be created. The user may restrict access settings such that the channel to be created is not generally accessible and/or searchable by other members of the group-based communication system by engaging the access setting element and adjusting it to "Private" (not shown). In such embodiments, a user must be invited to join the private group-based communication channel in order to view the contents or for the contents of such private group-based communication to be searchable by the invited user. Otherwise, the channel-creator user may allow for broad access to all members of the associated group-defined communication workspace by indicating that channel is to be public. The access settings element 304 in FIG. 3A is depicted as a toggle switch, however, other variations of the access settings element 304 are also contemplated by this disclosure as will be apparent to one of ordinary skill in the art. The depicted channel creation interface 300 further includes the channel create execution element 305, which is configured to allow a channel-creator user to indicate that the user wishes to create the group-based communication channel with the provided parameters and/or information.

The channel title suggestions circuitry 206 is configured for detecting engagement of the depicted channel title interface component 301. More particularly, engagement of the channel title interface component 301 by the user creates a channel title suggestion command and causes the channel title suggestions circuitry 206 to determine a channel title suggestion or set of channel title suggestions for association with the channel title suggestion command.

The channel title suggestions are based at least in part on a group-defined format protocol of a group-defined channel title template associated with the user's group identifier. The group-defined format protocol sets forth the channel title parameters throughout a particular group-based communication workspace. For example, a group-defined format protocol may define the language (e.g., English, French, German, and the like), length (e.g., 15 characters), or type of characters (e.g., alphanumeric characters) permitted in a channel title of a group-based communication channel. In some embodiments, the group-defined format protocol may define whether channel title suggestions comprise channel title prefixes, channel title suffixes, and/or the like. In some embodiments, the group-defined format protocol may be set by an administrator of a group-based communication workspace for use by users of the group-based communication workspace.

In addition to the group-based format protocol, some embodiments also base the determination of potential channel title suggestions on at least one additional data value or data item. For example, the channel title suggestions circuitry 206 may be further configured to retrieve and analyze data related to the user, other group-based communication channels, the group-based communication workspace, or even the group-based communication system as a whole in order to determine channel title suggestions. In the case of the user, the channel title suggestions circuitry 206 may retrieve user profile data associated with the user identifier of the user creating the channel from the group-based communication repository. User profile data may contain various information attributed to or associated with the user, such as user role data, user organization data, user topic data, and/or historical channel title data associated with the user identifier. For example, user role data may refer to the status of the user within a group-based communication channel, the company associated with the user or group, or other type of role. For example, a user associated with a particular company or organization may comprise roles such as "employee", "associate", "supervisor", "lawyer", "hr", and the like. User organization data may refer to an organization or commercial enterprise to which the user is related or employed by (e.g., employees of different companies may be separate organization groups). User topic data may refer to conversation topics with which the user is associated. For example, a particular user's messages may be analyzed or parsed to determine a topical context regarding the user (e.g., the user's expertise or interest in a topic may be determined based on the frequency of mention of the topic or key words associated with the topic within such messages).

Historical channel title data refers to all channel title data where a particular user identifier is indicated as the channel-creator user identifier. From historical channel title data, potential channel title suggestions may be determined based on the frequency or recency of user-defined channel title text components or portions thereof. For example, 5 of the last 7 channels created by the particular user may have contained the channel title prefix "client-" and the most recent channel created by the particular use may have contained the channel title prefix "sf-". Based on analysis of this historical channel title data and the associated group-defined format protocol, the channel title suggestions circuitry 206 may include "client-" and "sf-" as two of the plurality of recommended channel title suggestions 306 in the first channel title suggestions set.

Additionally, or alternatively, the channel title suggestions circuitry 206 may retrieve group channel data associated with the group identifier from the group-based communication repository for use in determination of channel title suggestions 306. Such group channel title data may include, among other things, channel title data, channel title count data, channel title recency data, channel activity data, and/or channel metadata associated with one or more group-based communication channels in the group-based communication workspace associated with the group identifier. For example, channel title count data may provide the number of times a user-defined channel title text component or portion thereof has been utilized in the associated group-based communication workspace. The higher the number of times a specific user-defined channel title text component or portion thereof has been utilized in channel titles in a group-based communication workspace, the more relevant such user-defined channel title text component or portion thereof may be to the user. Channel title recency data may reveal a user-defined channel title text component or portion thereof of current significance to the associated group-based communication workspace based on how recent the text component or portion thereof has been utilized. Channel activity data may reveal one or more group-based communication channels of current significance based on a level of user activity associated with each group-based communication channel. The higher the level of user activity of a group-based communication channel may suggest the relevancy of the associated user-defined channel title text component or portion thereof. The channel title suggestions circuitry 206 may determine one or more channel title suggestions 306 based on the analysis of such group channel data and the associated group-defined format protocol.

Additionally, or alternatively, the channel title suggestions circuitry 206 may retrieve system channel data correlated to all public (i.e., not private) group-based communication channels of a group-based communication system to determine channel title suggestions 306.

Furthermore, additionally, or alternatively, the channel title suggestions circuitry 206 may also be configured to receive a channel purpose input optionally entered in a channel purpose interface component 302 of the channel creation interface 300. Channel purpose input comprises an indication of a description or purpose to signify to other users of the intended use of the group-based communication channel to be created when such users browse channels. Based on the group-defined format protocol and such channel purpose input, the channel title suggestions circuitry 206 may determine one or more channel title suggestions 306 to suggest to the user.

Furthermore, additionally, or alternatively, the channel title suggestions circuitry 206 may also be configured to receive channel invitation input optionally entered in a channel invitation interface component 303 of the channel creation interface 300. Channel invitation input comprises an indication of at least one user recipient to be sent an invitation to join the group-based communication channel to be created. For example, the user may input indications of other users, such as partial or complete email addresses, usernames, real names, etc., the user intends to invite to join the group-communication channel that the user is creating. Based on the group-defined format protocol and such channel invitation input, the channel title suggestions circuitry 206 may determine one or more channel title suggestions 306 to suggest to the user. For example, all users indicated in the channel invitation input may be members of the same department of an organization, such as marketing, and the channel title suggestions circuitry 206 may determine one or more channel title suggestions 306 related to such department (e.g., # team-marketing-).

Each of user profile data, group channel data, system channel data, channel input data, and channel invitation input are discussed separately in this disclosure, however, it is contemplated that the channel title suggestions circuitry 206 also may use any combination of such data items in its determination of channel title suggestions 306. For example, the channel title suggestions circuitry 206 may correlate the user role data from the user profile with system channel data from another group-based communication workspace. That is, it is contemplated that the channel title suggestions circuitry 206 may be able to correlate data associated with a user from another organization that share profile attributes (e.g., user role data) with the user account associated with the client device. For example, a group-based communication system comprises a plurality of group-based communication workspaces, including the Slack Corp. group-based communication workspace and the ACME Corporation group-based communication workspace. In addition to utilizing Slack's group-defined format protocol, the channel title suggestions circuitry 206 may retrieve data and determine channel title suggestions 306 based on such data associated with Slack's Human Resources representative's counterpart at ACME Corporation.

The channel title suggestions circuitry 206 is also configured to prioritize and/or rank user-defined channel title text components of the channel title data. That is, the channel title suggestions circuitry 206 may assign scores or weights to the user-defined channel title text components and then use the scored/weighted user-defined channel title text components to determine channel title suggestions 306. The channel title suggestions circuitry 206 may assign scores or weights pursuant to any one of a plurality of methods. For example, the channel title suggestions circuitry 206 may be configured to determine and assign a relevancy score based on such factors as frequency and recency of use. Data associated with the individual user may be weighted more or less compared to data associated with the group identifier or the system. It is contemplated that the group-defined format protocol defines such relevancy scores and specifies the parameters to be utilized in determining such scores.

It should be pointed out that the above scoring of data by the channel title suggestions circuitry 206 (e.g., frequency, recency, and user vs. group vs. system data) are for purposes of illustration and not of limitation and other suitable variations of assigning scores or weighting the user-defined channel title text components are also contemplated by this disclosure as will be apparent to one of ordinary skill in the art.

In some example embodiments, the channel title suggestions circuitry 206 may score/weight the user-defined channel title text components of the channel title data and determine recommended channel title suggestions 306 based in part on comparing a ranking of the channel title suggestion to a predetermined threshold. For example, the channel creation interface 300 may be predefined to include or render a predetermined number (e.g., 5) of channel title suggestions. As such, in an example embodiment, the top number (e.g. top 5) of channel title suggestions in the ranking (e.g., user-defined title text components with the top 5 scores) corresponding to the predetermined number (e.g., 5) of channel title suggestions defined for inclusion in the channel creation interface 300 may be subjected to the group-defined format protocol of the group-defined channel title in order to define the first channel title suggestions set.

In an alternative example embodiment, the channel title suggestions circuitry 206 may determine that user-defined channel title text components having a score above a predetermined threshold (e.g., 0.8) may be subjected to the group-defined format protocol of the group-defined channel title and included in the channel creation interface 300 as the first channel title suggestions set. In this regard, the first channel title suggestions set included in the channel creation interface 300 for display may vary between 1 and some upper limit number (e.g., 10, 100) of suggested query items defined to be included in the channel creation interface 300.

Returning to FIG. 3B, the rendering of the first channel title suggestions set is revealed and/or accessed once a user clicks on or otherwise engages (e.g., touches or selects) the channel title interface component 301. Examples of such engagement include, for example, non-keystroke and keystroke engagement. In other words, in addition to determining a channel title suggestion or set of channel title suggestions in response to detecting engagement of the channel title interface component 301, the channel title suggestions circuitry 206 is configured to render a first channel title suggestions set to the channel title interface component 301 upon detection of an engagement of the channel title interface as illustrated in FIG. 3B. The channel title suggestions circuitry 206 prompts the user to utilize a channel title suggestion 306 based at least in part on the group-defined format protocol associated with the group identifier of the user.

In the example channel creation interface 300 of FIG. 3B, the channel title suggestions circuitry 206 presents the five channel title suggestions 306 immediately below the channel title interface component 301. In this regarding, in the example of FIG. 3B, one of the channel title suggestions 306 pertains to a selectable channel title suggestion "client-" and another of the channel title suggestions 306 pertains to a selectable channel title suggestion "proj-". Furthermore, another channel title suggestion 306 pertains to a selectable channel title suggestion "help-". In addition, another channel title suggestion 306 pertains to a selectable channel title suggestion "sf-" and another channel title suggestion 306 pertains to a selectable channel title suggestion "team-".

The channel title suggestions circuitry 206 may order the display of the channel title suggestions 306 to the channel creation interface 300 in a myriad of ways. In an instance where the channel title suggestions circuitry 206 prioritizes and/or ranks user-defined channel title text components of the channel title data, the channel title suggestions circuitry 206 may also order the display of the channel title suggestions 306 within the channel creation interface 300 based on channel title rankings. In another instance, the channel title suggestions circuitry 206 may order the display of the channel title suggestions 306 based on the alphabetical sequence of the channel title suggestions 306. In embodiments, the display of the channel title suggestions 306 may re-render with fewer channel title suggestions with each additional keystroke entry (i.e., the suggestions may be filtered according to additionally received text input). Other variations of ordering the channel title suggestions 306 are also contemplated by this disclosure as will be apparent to one of ordinary skill in the art.

In some embodiments, each channel title suggestion 306 comprises a programmatically generated text portion and a user-defined text portion. For example, in the depicted channel creation interface 300 of FIG. 3B, the text component before each "-" character (e.g., client-, proj-, help-, sf-, team-) in the list of channel title suggestions 306 is a programmatically generated text portion and the channel title interface component 301 is configured to facilitate user entry of a user-defined text portion after the "-" as depicted in FIG. 3C. The programmatically generated text portion of the channel title suggestions 306 may be specified as any portion of the channel title. For example, as depicted in FIGS. 3B and 3C, each programmatically generated text portion is a channel title prefix to be placed at the beginning of a user-defined channel title text component. However, other variations of the programmatically generated text portion (e.g., a channel title suffix, a channel title root word, combinations thereof, etc.) are also contemplated by this disclosure as will be apparent to one of ordinary skill in the art. In embodiments, channel title suggestions for channel title prefixes may be associated with or based on primary preferred channel title prefixes and/or secondary preferred channel title prefixes.

The programmatically generated text portion and the user-defined portion of the channel title suggestions 306 may also comprise one or more delimiters. For example, each of programmatically generated text portions in the list of channel title suggestions 306 depicted in FIG. 3B contain a hyphen ("-") delimiter. However, other variations of the delimiters (e.g., an underscore ("_") or the like) are also contemplated by this disclosure as will be apparent to one of ordinary skill in the art.

Furthermore, the channel title suggestions circuitry 206 may be configured to retrieve channel title description components 308 associated with each channel title suggestion 306 and display the channel title description component 308 in association with the rendering of the channel title suggestion 306. A channel title description component 308 provides an explanation of how the user may use a channel title suggestion 306. In some embodiments, the channel title description component 308 includes both an explanation of the channel title suggestion 306 and an instructive example of the channel title suggestion 306 in context. For example, the channel title description components 308 displayed below the channel title interface component 301 in FIG. 3B are examples of channel title description components. As depicted in FIG. 3B, the channel title description component 308 associated with the channel title suggestion 306 "proj-" provides an explanation (i.e., "for ongoing projects") and an instructive example (i.e., "#proj-cafe-build").

Put in the context of the operations of a group-based communication apparatus, the above described channel title suggestions process proceeds as follows: receive from a client device, a channel creation request associated with a group identifier; retrieve a group-defined channel title template associated with the group identifier from a group-based communication repository, the group-defined channel title template comprising a group-defined format protocol; cause rendering of a channel creation interface in response to receipt of the channel creation request, wherein the channel creation interface comprises a channel title interface component; detect engagement of the channel title interface component of the channel creation interface; and in response to detecting the engagement of the channel title interface component, determine a first channel title suggestions set based on the group-defined format protocol of the group-defined channel title template and cause rendering of the first channel title suggestions set (i.e., client-, proj-, help-, sf-, team-) to the channel creation interface.

Returning to FIG. 3B, the channel title suggestions circuitry 206 is configured to detect an indication of a selection by the user of one of the channel title suggestions 306 rendered on the channel creation interface 300. Selection by the user includes clicking on, touching, or otherwise selecting one of the selectable channel title suggestions 306. Referring now to FIG. 3C, in response to the user's selection of the "proj-" programmatically generated text portion of the channel title suggestions 306 rendered on the channel creation interface 300, the channel title suggestions circuitry 206 renders the selected channel title suggestion 306 (e.g., "proj-") in the channel title interface component 301 and removes the rendering of the first channel title suggestions set from the channel creation interface 300. The channel title interface component 301 is further configured to facilitate user entry of a user-defined text portion of the channel title suggestion 306 after the hyphen delimiter (e.g., "-") as depicted by the placement of the blinking cursor in the embodiment of FIG. 3C. In other embodiments, the programmatically generated text portion is a channel title suffix and the channel title interface component 301 is further configured to facilitate user entry of a user-defined text portion of the channel title suggestion 306 before the programmatically generated text portion.

As yet another example, in addition to detecting the clicking on, touching, or otherwise selecting one of the selectable channel title suggestions 306, the channel title suggestions circuitry 206 is configured to detect a keystroke input to the channel title interface component 301 of the channel creation interface 300. In response to detecting a keystroke engagement to the channel title interface component 301, the channel title suggestions circuitry 206 may determine a second channel title suggestions set based on the group-defined format protocol and the detected keystroke engagement. For example, in an embodiment wherein the channel title suggestions circuitry 206 may score/weight the user-defined channel title text components of the channel title data and determine recommended channel title suggestions 306 based in part on a channel title ranking, the channel title suggestions circuitry 206 may further update the ranking (e.g., as each keystroke is input to the channel title interface component 301) of the channel title suggestions 306 based on the detected keystroke(s) to define a second channel title suggestions set. For purposes of illustration and not of limitation, referring to FIG. 3D, in an instance in which the letters "d" and "e" are entered into the channel title interface component 301 by the user, the channel title suggestions circuitry 206 may retrieve group channel data and determine that other group-based communication channels in the group-based communication workspace correlated to the group identifier begin with "demo-", "design-", and "devel-". In this regard, a number of channel title suggestions 306 beginning with the letters "de" that have top scores may be defined by the channel title suggestions circuitry 206 as a second channel title suggestions set.

In yet another example, the channel title suggestions circuitry 206 may determine that the detected keystroke(s) do not conform to the group-defined format protocol associated with the group identifier of the user. For purposes of illustration and not of limitation, in an instance in which "marketing-team" is entered into the channel title interface component 301 by the user, the channel title suggestions circuitry 206 may determine that such detected keystrokes correspond to a channel title text component that does not confirm to the group-format protocol associated with the group identifier of the user. For example, the group-defined format protocol may require that "team" is utilized as a channel title prefix, not as a channel title suffix as currently entered in the channel title interface component 301. The channel title suggestions circuitry 206 may determine a second channel title suggestions set which includes "team-marketing" as the top-rated channel title suggestion 306.

In yet another example for purposes of illustration and not of limitation, in an instance in which the letters "a", "c", "c", "o", "u", "n", and "t" are entered into the channel title interface component 301 by the user, the channel title suggestions circuitry 206 may determine that such a channel title prefix (i.e., "account-") is not utilized by the group-format protocol associated with the group identifier of the user and instead a channel title prefix such as "client-" is utilized, the channel title suggestions circuitry 206 may determine a second channel title suggestions set which includes "client-" as the top rated channel title suggestion 306. In response to the channel title suggestions circuitry 206 determining the second channel title suggestions set, the channel title suggestions circuitry 206 may automatically update the channel creation interface 300 to replace the first channel title suggestions set with the second channel title suggestions set.

Additionally, and or alternatively, the channel title suggestions circuitry may determine that the "account-" channel title prefix correlates to the group-defined format protocol of a related group-based communication workspace and provide one or more group-based communication workspace suggestions instead of or in addition to one or more channel title suggestions 306. For purposes of illustration and not of limitation, in an instance in which the group identifier associated with the channel creation request is the project engineering department of an organization and the term "account-" is entered into the channel title interface component 301 by the user, the channel title suggestions circuitry 206 may determine that such a channel title prefix (i.e., "account-") is not utilized by the group-format protocol associated with the project engineering department but is utilized by the group identifier associated with the sales department of the same organization. In response to such a determination, the channel title suggestions circuitry 206 may provide the sales department's group-based communication workspace as a workspace suggestion in which the channel may be created.

In an example embodiment, channel creation request is further associated with a user identifier and the group-based communication apparatus receives input of a user-defined channel title text component and stores such user-defined channel title text component in association with a user identifier and the group identifier of the user as channel title data. More particularly, the user indicates the completion of such user-defined channel title text component input by engaging a channel create execution element 305, as depicted in FIG. 3A. Engagement of the create execution element creates a channel creation command comprising the user-defined channel title text component(s), the channel-creator user identifier, the group identifier, and a group-based communication channel identifier associated with the created group-based communication channel. The user-defined channel title text component(s) are then stored in real-time to the group-based communication repository in association with the channel-creator user identifier, the group identifier, and the group-based communication channel identifier as channel title data. The newly stored channel title data may then be used to determine channel title suggestions 306 for group-based communication channels created thereafter.

The group-based communication apparatus also contemplates providing channel title suggestions at times other than at creation of a group-based communication channel. For example, over time, the intention or content of group-based communication channel may evolve or mature with use. Similar to channel creation, when a pre-existing group-communication channel is to be re-named, a channel settings interface 400 may be rendered in response to receipt of a channel settings modification request. In some embodiments, the channel settings interface 400 is revealed and/or accessed once a user clicks on a "Settings" visual indicator (not shown) in relation to a "Channels" interface element (not shown) of a group-based communications interface (not shown).

Referring to FIG. 4A, the channel title update interface component 401 is configured for, among other things, user entry of a user-defined updated channel title text component. The channel purpose update interface component 402 is configured for user entry of an updated or revised description or purpose for the pre-existing group communication channel. The channel access settings update element 403 is configured to allow a user to update or modify the accessibility and searchability parameters of the pre-existing group-based communication channel. The channel archive settings element 406 is configured to allow a user to indicate whether the pre-existing group-based communication channel should be archived or not. The channel settings interface 400 further includes the channel update settings execution element 405, which is configured to allow a user to indicate that the user wishes to update the provided parameters and/or information for the pre-existing group-based communication channel FIGS. 4B and 4C depict examples of additional embodiments related to renaming of group-based communication channels. In addition to a channel title update interface component 401, the channel renaming interface 404 of FIG. 4B further includes a channel renaming execution element 407, which is configured to allow a user to indicate that the user wishes to update the channel title parameter for the pre-existing group-based communication channel The channel title suggestions circuitry 206 has similar capabilities for determining and providing channel title suggestions with respect to pre-existing group-based communication channels as is disclosed herein with respect to a group-based communication channel to be created. For example, the channel title suggestions circuitry 206 is configured for detecting engagement of the channel title update interface component 401 of the channel settings interface 400 or the channel renaming interface 404, and determining one or more channel title suggestions.

It is also contemplated that the group-based communication apparatus may provide audit capabilities with respect to user-defined channel title text components created by users. For purposes of illustration and not of limitation, in an instance in which the user creates a group-based communication channel with a user-defined channel title text component that does not conform with the group-defined format protocol associated with the group identifier of the channel creation request, the group-based communication apparatus may be further configured to provide a notification of such non-conformance. For example, the group-based communication apparatus may provide a notification (e.g., alert, audit log entry, text message, electronic mail, etc.) to an administrator of the group-based communication workspace and/or the channel-creator user, notifying the individual(s) of such non-compliance.

A group-based communication apparatus, using channel title suggestions circuitry 206, may proceed to manage group-based communication channels of a group-based communication interface in accordance with the process blocks of the flowchart 500 of FIG. 5A. The depicted process begins at Block 502 where the group-based communication apparatus receives a channel creation request associated with a group identifier.

At Block 504, the group-based communication apparatus retrieves a group-defined channel title template associated with the group identifier from a group-based communication repository, the group-defined channel title template comprising a group-defined format protocol. The group-based communication apparatus causes rendering of a channel creation interface in response to receipt of the channel creation request, wherein the channel creation interface comprises a channel title interface component at Block 506. For example, a channel creation interface 300 comprising a channel title interface component 301 as shown in FIG. 3A may be rendered to the group-based communication interface rendered to a client device of a user.

At Block 508, the group-based communication apparatus detects engagement of the channel title interface component of the channel creation interface. In response to detecting engagement of the channel title interface component at Block 508, the group-based communication apparatus determines a first channel title suggestions set based on the group-defined format protocol of the group-defined channel title template and causes rendering of the first channel title suggestions set to the channel creation interface at Block 510. The plurality of channel title suggestions 306 in the first channel title suggestions set may be organized alphabetically, by channel title ranking, or by some other appropriate method as disclosed herein. In addition to the rendering of the channel title suggestions 306, the display of the channel creation interface may be adjusted such that an emphasis of the channel title interface component is demonstrated in response to detection of user engagement of the channel title interface component. In the depicted embodiment in FIG. 3B, the color and weight of the border surrounding the channel title interface component 301 changes from a thin gray line to a thicker blue line.

At Block 510, the group-based communication apparatus determines a first channel title suggestions set based on the group-defined format protocol of the group-defined channel title template and causes rendering of the first channel title suggestions set to the channel creation interface 300, such as depicted in FIG. 3B.

In some embodiments, the group-based communication apparatus may receive input from a user of a user-defined channel title text component in the channel title interface component. In such embodiments, the channel creation request is associated with a user identifier and the group-based communication apparatus receives the user-defined channel title text component at Block 512. At Block 514, the group-based communication apparatus associates the user-defined channel title text component with the user identifier and group identifier and at Block 516, the group-based communication apparatus is configured to cause storage of channel title data in the group-based communication repository, wherein the channel title data comprises the user-defined channel title text component, the user identifier, and the group identifier.

FIG. 5B is a signal diagram of an example data flow represented by method 500. Method 500 is described as being performed by a client device 101A, a group-based communication apparatus 210, and a group-based communication repository 207. These may be similar to those previously discussed with regards to FIG. 1.

Generating a Work Graph of Group-Based Communication Objects

Group-based communication objects may be stored in one or more database storage areas of the group-based communication repository 207 during applicable data indexing procedures. Moreover, such group-based communication objects may be stored as entries of a graphical database (or a relational database providing similar functionality for illustrating relationships between group-based communication objects, or any of a variety of other database storage structures for providing similar data storage configurations), providing data illustrative of generated relationships between various group-based communication objects. Those relationships between group-based communication objects may be generated based at least in part on metadata and body content data generated and appended to various group-based communication objects, and channel title data.

The relationships between group-based communication objects define a work graph illustrating relationships among a plurality of group-based communication objects, which may be usable by one or more artificial intelligence-based search systems for identifying a plurality of inter-related group-based communication objects to be presented in response to a particular search query or command. In certain embodiments, group-based communication objects stored within a work graph are each characterized by their own access credentials/requirements. Accordingly, some group-based communication objects within the work graph may only be accessible to a select group of users (e.g., a single user), whereas other group-based communication objects within the same work graph may be accessible to a larger/different group of users (e.g., all users associated with a particular group-based communication workspace). Despite these differences in accessibility between various group-based communication objects within a common work graph, relationships established between various group-based communication objects may be usable to establish topics for various group-based communication objects, for establishing a particular user's expertise, to determine relatedness of group-based communication objects for search queries, and/or the like.

For each group-based communication object, the group-based communication repository 207, the group-based communication apparatus 210, or other components of the group-based communication system 200 may perform an analysis of the body contents and/or metadata and/or supplemental metadata generated by the group-based communication system 200 to determine other group-based communication objects deemed sufficiently relevant to illustrate a connection within the work graph Channel title data and its associated relationships to the group-based communication objects discussed herein add a valuable signal to be leveraged by the group-based communication system to inform any work graph data structure that is assembled to represent or otherwise embody a group-based communication object corpus.

As such, the group-based communication apparatus is further configured to access a group-based communication object corpus based on the group-defined format protocol. Each group-based communication object of the group-based communication object corpus comprises metadata, body content data, and channel title data.

In various embodiments, the group-based communication apparatus is configured to determine each group-based communication object's relationship to other group-based communication objects based on the metadata, body content data, and the channel title data. The group-based communication apparatus is thus configured to assemble the group-based object corpus into a work graph data structure.

In certain embodiments, the group-based communication apparatus may identify shared topics within metadata of one group-based communication object relative to other group-based communication objects; identify common sending user identifiers; identify common event participants (a greater number or percentage of shared participants may provide a stronger indicated relationship); identify common group-based communication object types; identify common intended recipients; identify temporal relationships between generation/transmission of group-based communication objects; identify common user-defined channel title text components; identify shared channel title text components; identify similar channel title text components; and/or the like.

The group-based communication apparatus may establish weighted relationship scores between each of the group-based communication objects of the group-based communication object corpus. For example, stronger relationships (e.g., a higher number of shared characteristics), or certain types of relationships (e.g., as identified via a machine learning algorithm) may result in a higher relationship score between the analyzed group-based communication object and one or more other group-based communication objects. These relationship scores may be ranked (e.g., by direct comparison of relationship scores, by normalization of comparison scores on a shared scale (e.g., 0-1), and/or the like). In certain embodiments, those relationship scores satisfying a first degree score criteria (e.g., exceeding a score threshold) may be utilized to establish direct relationships between the analyzed group-based communication object and those other group-based communication objects having a sufficient relationship score. Those first degree scores may then be mapped within the work graph data structure (e.g., by establishing edges between data indicative of group-based communication objects within a graphical database, by providing data indicative of related group-based communication objects within data of a particular group-based communication object database entry within a relational database, and/or the like). The process may then be repeated for each user identifier of a given group-based communication workspace or set of group-based communication workspaces.

It should be understood that, in accordance with certain embodiments, relationships between various group-based communication objects may be symmetrical (e.g., the degree of relatedness of a first object to a second object is identical to the degree of relatedness of the second object to the first object). However, it should be understood that in other embodiments, the relationships between various group-based communication objects may be asymmetrical (e.g., the degree of relatedness of a first object to a second object is not identical to the degree of relatedness of the second object to the first object).

Although work graph data structures assembled as described herein may illustrate relationships between various group-based communication objects, the work graph data structures may also be utilized to determine relationships between users, between users and group-based communication channels, between users and topics, between group-based communication channels and topics, between group-based communication channels, between topics, between users and group-based communication objects, between group-based communication channels and group-based communication objects, between topics and group-based communication objects, and/or the like. Thus, the work graph data structure may be configured to establish relationships between group-based communication objects, and those relationships may be further utilized to identify relationships between other aspects of data utilized with the group-based communication apparatus (such as data indicative of particular users, channels, workspaces, and/or the like).

The group-based communication system (e.g., via the group-based communication repository 207 and/or the like) utilizes the work graph data structure to generate a machine learning structure (e.g., a neural network) that may be utilized for executing search queries for users. For example, the group-based communication system may implement an unsupervised learning structure, a supervised learning structure, a reinforcement learning structure, a deep learning structure, and/or the like for utilizing relationships established via the work graph data structure to generate search results for various group-based communication objects.

In certain embodiments, a global machine learning algorithm may be utilized for all group-based communication objects stored at or accessible via the group-based communication platform system. In such embodiments, access to particular group-based communication objects (e.g., via a search query utilizing the machine-learning algorithm) may be limited based at least in part on access privileges of the searching user (e.g., a user may only be able to access group-based communication objects associated with permitted group-based communication channels). In other embodiments, machine learning algorithms may be established independently for each of a plurality of groups, such that training of the machine learning algorithm is based on group-based communication objects exchanged within the particular group alone.

The machine learning algorithms may be generated and/or updated periodically, to reflect changes within the work graph data structure that result from the addition and/or aging of group-based communication objects within the work graph data structure. Moreover, the machine learning parameters (including those parameters indicative of the underlying neural network of the machine learning algorithm) may be stored within the group-based communication repository.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, implemented at least in part by a server computing device associated with a communication platform, the method comprising:
receiving, from a first computing device associated with a first user via an instance of an application associated with the communication platform, a request to generate a channel, the request to generate the channel comprising a group identifier;
causing a channel creation interface associated with the application to be rendered for display at the first computing device based at least in part on the request to generate the channel;
receiving, from the first computing device, an indication of interaction with the channel creation interface;
determining, based at least in part on the indication of interaction and a group-defined format protocol associated with the group identifier, at least a portion of a channel title to suggest to the first user; and
causing the at least the portion of the channel title to be rendered for display via the channel creation interface.

2. The method of claim 1, wherein the at least the portion of the channel title comprises a prefix associated with the channel title.

3. The method of claim 1, wherein determining the at least the portion of the channel title to suggest to the first user is based at least in part on at least one of:
channel title data;
channel title count data;
channel title recency data;
channel activity data; or
channel metadata associated with channels corresponding to the group identifier.

4. The method of claim 1, further comprising:
receiving, from the first computing device via the channel creation interface, an input corresponding to the channel title associated with the channel;
generating the channel based at least in part on the input; and
associating the channel with the group identifier, the channel being associated with the channel title.

5. The method of claim 4, wherein the input comprises a first input, the method further comprising:
receiving, from the first computing device, a request to modify the channel;
causing a channel update interface associated with the application to be rendered for display at the first computing device based at least in part on the request to modify the channel, the channel update interface being configured for entry of a description of the channel;
receiving, from the first computing device via the channel update interface, a second input corresponding to the description of the channel; and
associating the description of the channel with the channel.

6. The method of claim 4, further comprising:
receiving, from the first computing device, a request to modify the channel;
causing a channel update interface associated with the application to be rendered for display at the first computing device based at least in part on the request to modify the channel, the channel update interface being configured for entry of an updated channel title;
receiving, from the first computing device via the channel update interface, a request to rename the channel, the request to rename the channel comprising the updated channel title;

comparing the updated channel title to the group-defined format protocol to determine that the updated channel title does not comply with the group-defined format protocol;
generating a notification of non-compliance associated with the updated channel title; and
causing the notification to be rendered for display at the first computing device or a second computing device associated with an administrator of the channel.

7. A system comprising:
one or more processors; and
computer readable media storing instructions that, when executed, cause the system to perform operations comprising:
receiving, from a first computing device associated with a first user via an instance of an application associated with a communication platform, a request to generate a channel, the request to generate the channel comprising a group identifier;
causing a channel creation interface associated with the application to be rendered for display at the first computing device based at least in part on the request to generate the channel;
receiving, from the first computing device, an indication of interaction with the channel creation interface;
determining, based at least in part on the indication of interaction with the channel creation interface and the group identifier, at least a portion of a channel title to suggest to the first user; and
causing the at least the portion of the channel title to be rendered for display via the channel creation interface.

8. The system of claim 7, wherein the at least the portion of the channel title comprises a prefix associated with the channel title.

9. The system of claim 7, the operations further comprising:
receiving, from the first computing device via the channel creation interface, an input corresponding to the channel title associated with the channel;
generating the channel based at least in part on the input; and
associating the channel with at least one of the group identifier or a user identifier, the channel being associated with the channel title.

10. The system of claim 9, the operations further comprising:
receiving, from the first computing device, a request to modify the channel;
causing a channel update interface associated with the application to be rendered for display at the first computing device based at least in part on the request to modify the channel, the channel update interface being configured for entry of a description of the channel;
receiving, from the first computing device via the channel update interface, a second input corresponding to the description of the channel; and
associating the description of the channel with the channel.

11. The system of claim 9, the operations further comprising:
receiving, from the first computing device, a request to modify the channel;
causing a channel update interface associated with the application to be rendered for display at the first computing device based at least in part on the request to modify the channel, the channel update interface being configured for entry of an updated channel title;
receiving, from the first computing device, an indication of interaction with the channel update interface;
based at least in part on the indication of interaction with the channel update interface, determining an updated prefix for the channel to suggest to the first user; and
causing the updated prefix to be presented for display at the first computing device.

12. The system of claim 9, the operations further comprising:
receiving, from the first computing device, a request to modify the channel;
causing a channel update interface associated with the application to be rendered for display at the first computing device based at least in part on the request to modify the channel, the channel update interface being configured for entry of an updated channel title;
receiving, from the first computing device via the channel update interface, a request to rename the channel, the request to rename the channel comprising the updated channel title;
comparing the updated channel title to a group-defined format protocol associated with the group identifier to determine that the updated channel title does comply with the group-defined format protocol;
generating a notification of non-compliance associated with the updated channel title; and
causing the notification to be rendered for display at the first computing device or a second computing device associated with an administrator of the channel.

13. The system of claim 9, the operations further comprising:
receiving, from the first computing device, a request to modify a parameter of the channel, wherein the parameter comprises at least one of an accessibility of the channel or a searchability of the channel;
modifying the parameter of the channel based at least in part on the request to modify the parameter; and
associating the modified parameter with the channel.

14. The system of claim 7, wherein determining at least the portion of the channel title to suggest to the first user is based at least in part on at least one of:
channel title data;
channel title count data;
channel title recency data;
channel activity data; or
channel metadata associated with channels corresponding to the group identifier.

15. One or more non-transitory computer readable media storing computer-executable instructions that, when executed by one or more processors of a server computing device associated with a communication platform, cause the server computing device to perform operations comprising:
receiving, from a first computing device associated with a first user via an instance of an application associated with the communication platform, a request to generate a channel, the request to generate the channel comprising a group identifier;
causing a channel creation interface associated with the application to be rendered for display at the first computing device based at least in part on the request to generate the channel;
receiving, from the first computing device, an indication of interaction with the channel creation interface;

determining, based at least in part on the indication of interaction and the group identifier, at least a portion of a channel title to suggest to the first user; and causing the at least the portion of the channel title to be rendered for display via the channel creation interface.

16. The one or more non-transitory computer readable media of claim 15, wherein the at least the portion of the channel title comprises a prefix associated with the channel title.

17. The one or more non-transitory computer readable media of claim 15, wherein determining the at least the portion of the channel title to suggest to the first user is based at least in part on at least one of:
 channel title data;
 channel title count data;
 channel title recency data;
 channel activity data; or
 channel metadata associated with channels corresponding to the group identifier.

18. The one or more non-transitory computer readable media of claim 15, the operations further comprising:
 receiving, from the first computing device via the channel creation interface, an input corresponding to the channel title associated with the channel;
 generating the channel based at least in part on the input; and
 associating the channel with the group identifier, the channel being associated with the channel title.

19. The one or more non-transitory computer readable media of claim 18, the operations further comprising:
 receiving, from the first computing device, a request to modify the channel;
 causing a channel update interface associated with the application to be rendered for display at the first computing device based at least in part on the request to modify the channel, the channel update interface being configured for entry of a description of the channel;
 receiving, from the first computing device via the channel update interface, a second input corresponding to the description of the channel; and
 associating the description of the channel with the channel.

20. The one or more non-transitory computer readable media of claim 18, the operations further comprising:
 receiving, from the first computing device, a request to modify the channel;
 causing a channel update interface associated with the application to be rendered for display at the first computing device based at least in part on the request to modify the channel, the channel update interface being configured for entry of an updated channel title;
 receiving, from the first computing device via the channel update interface, a request to rename the channel, the request to rename the channel comprising the updated channel title;
 comparing the updated channel title to a group-defined format protocol associated with the group identifier to determine that the updated channel title does not comply with the group-defined format protocol;
 generating a notification of non-compliance associated with the updated channel title; and
 causing the notification to be rendered for display at the first computing device or a second computing device associated with an administrator of the channel.

\* \* \* \* \*